United States Patent
Kim

(10) Patent No.: US 10,305,090 B2
(45) Date of Patent: May 28, 2019

(54) COMPOSITE ELECTRODE ACTIVE MATERIAL, ELECTRODE AND LITHIUM BATTERY INCLUDING THE COMPOSITE ELECTRODE ACTIVE MATERIAL, AND METHOD OF PREPARING THE COMPOSITE ELECTRODE ACTIVE MATERIAL

(71) Applicants: Samsung Electronics Co., Ltd., Suwon-si, Gyeonggi-do (KR); Samsung SDI Co., Ltd., Yongin-si, Gyeonggi-do (KR)

(72) Inventor: Guesung Kim, Suwon-si (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 497 days.

(21) Appl. No.: 15/080,773

(22) Filed: Mar. 25, 2016

(65) Prior Publication Data
US 2017/0092932 A1    Mar. 30, 2017

(30) Foreign Application Priority Data
Sep. 24, 2015    (KR) .................. 10-2015-0135550

(51) Int. Cl.
*H01M 4/131*    (2010.01)
*H01M 4/04*    (2006.01)
(Continued)

(52) U.S. Cl.
CPC ........... *H01M 4/131* (2013.01); *C01G 53/00* (2013.01); *C01G 53/006* (2013.01); *H01M 4/133* (2013.01); *H01M 4/134* (2013.01); *H01M 4/1315* (2013.01); *H01M 4/366* (2013.01); *H01M 4/382* (2013.01); *H01M 4/386* (2013.01); *H01M 4/483* (2013.01); *H01M 4/485* (2013.01); *H01M 4/502* (2013.01); *H01M 4/523* (2013.01); *H01M 4/56* (2013.01); *H01M 4/583* (2013.01); *H01M 4/587* (2013.01); *H01M 10/0525* (2013.01); *C01P 2002/32* (2013.01); *C01P 2002/50* (2013.01); *C01P 2002/52* (2013.01);
(Continued)

(58) Field of Classification Search
CPC ........................... H01M 4/131; H01M 4/1315
See application file for complete search history.

(56) References Cited

U.S. PATENT DOCUMENTS 8,852,740 B2    10/2014    Oki et al.
2007/0007897 A1*    1/2007    Billings ............... H01J 61/302
                                                                    313/634
(Continued)

FOREIGN PATENT DOCUMENTS

JP    5524202 B2    4/2014
JP    5494792 B2    5/2014
(Continued)

*Primary Examiner* — Stephan J Essex
(74) *Attorney, Agent, or Firm* — Cantor Colburn LLP

(57) ABSTRACT

A composite electrode active material including: a core, which is capable of intercalating and deintercalating lithium; and a surface treatment layer disposed on the core, wherein the surface treatment layer comprises a lithium-free oxide that has a spinel structure and includes a dopant, wherein the dopant includes at least one selected from fluorine, sulfur, nitrogen, boron, and phosphorous.

20 Claims, 6 Drawing Sheets

(51) Int. Cl.
  *H01M 10/0525* (2010.01)
  *H01M 4/1315* (2010.01)
  *H01M 4/36* (2006.01)
  *H01M 4/48* (2010.01)
  *H01M 4/50* (2010.01)
  *H01M 4/505* (2010.01)
  *H01M 4/52* (2010.01)
  *H01M 4/525* (2010.01)
  *H01M 4/56* (2006.01)
  *C01G 53/00* (2006.01)
  *H01M 4/133* (2010.01)
  *H01M 4/134* (2010.01)
  *H01M 4/38* (2006.01)
  *H01M 4/485* (2010.01)
  *H01M 4/583* (2010.01)
  *H01M 4/587* (2010.01)

(52) U.S. Cl.
  CPC ...... *C01P 2002/72* (2013.01); *C01P 2002/74* (2013.01); *C01P 2002/85* (2013.01); *C01P 2004/80* (2013.01); *C01P 2004/84* (2013.01); *Y02T 10/7011* (2013.01)

(56) References Cited

U.S. PATENT DOCUMENTS

| | | | |
|---|---|---|---|
| 2012/0163090 A1* | 6/2012 | Kubo | B82Y 10/00 365/185.18 |
| 2012/0282521 A1 | 11/2012 | Choi et al. | |
| 2013/0071745 A1 | 3/2013 | Mun et al. | |
| 2013/0115513 A1 | 5/2013 | Choi et al. | |
| 2014/0050981 A1 | 2/2014 | Kang et al. | |
| 2014/0370394 A1 | 12/2014 | Ruediger-Bernd et al. | |

FOREIGN PATENT DOCUMENTS

| | | |
|---|---|---|
| JP | 2015518263 A | 6/2015 |
| KR | 1020120124779 A | 11/2012 |
| KR | 1020130030660 A | 3/2013 |
| KR | 1020130050161 A | 5/2013 |

\* cited by examiner

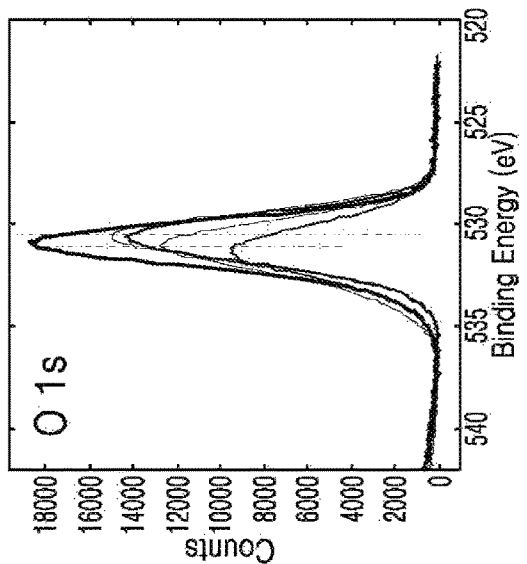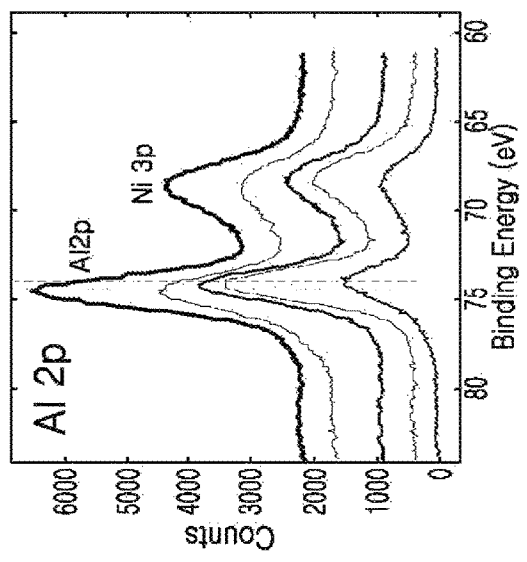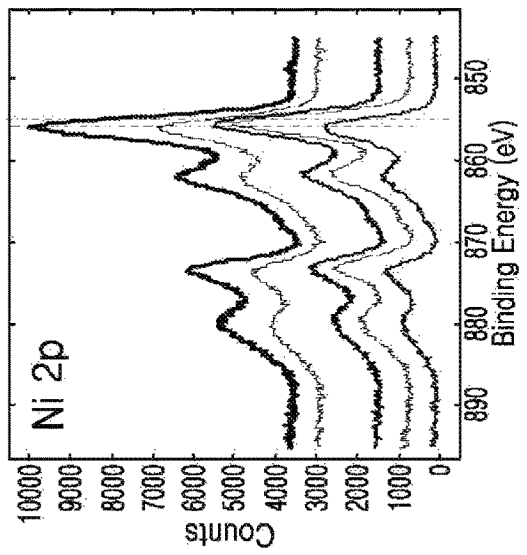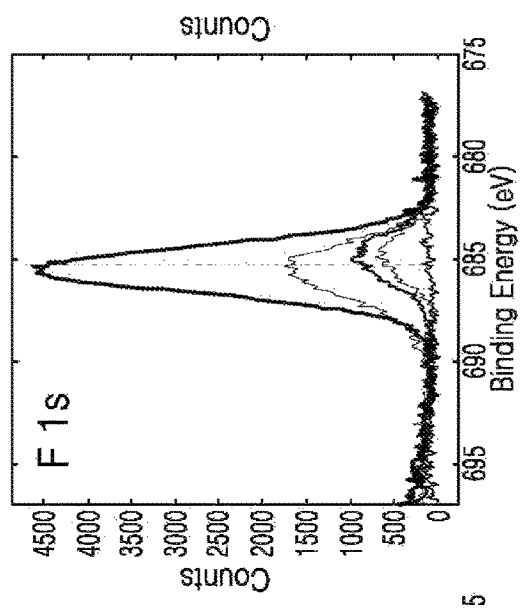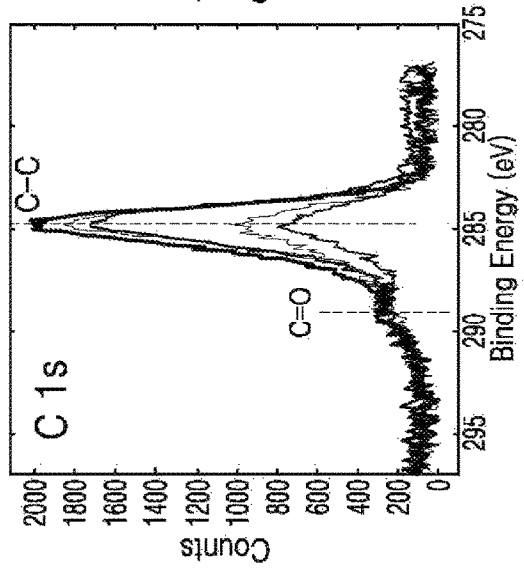

COMPOSITE ELECTRODE ACTIVE MATERIAL, ELECTRODE AND LITHIUM BATTERY INCLUDING THE COMPOSITE ELECTRODE ACTIVE MATERIAL, AND METHOD OF PREPARING THE COMPOSITE ELECTRODE ACTIVE MATERIAL

CROSS-REFERENCE TO RELATED APPLICATION

This application claims priority to and the benefit of Korean Patent Application No. 10-2015-0135550, filed on Sep. 24, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a composite electrode active material, electrodes and lithium batteries including the composite electrode active material, and methods of preparing the composite electrode active material.

2. Description of the Related Art

With the advance of electronics technologies, the market for various mobile electronic devices is rapidly growing. Examples of the various mobile devices include mobile phones, game devices, portable multimedia players (PMPs), mpeg audio layer-3 (MP3) players, smartwatches, smartphones, smart pads, E-book readers, tablet computers, and wearable devices. As the market for the various mobile electronic devices is growing, there is an increasing need for an improved battery for operation of such mobile devices. Thus there remains a need for an improved electrode active material.

SUMMARY

Provided is a composite electrode active material which is capable of providing reduced the degradation in the performance of a battery under a high temperature and high voltage condition.

Provided is an electrode including the composite electrode active material.

Provided is a lithium battery including the electrode.

Provided are methods of preparing the composite electrode active material.

Additional aspects will be set forth in part in the description which follows and, in part, will be apparent from the description.

According to an aspect of an exemplary embodiment, a composite electrode active material includes: a core, which is capable of intercalating and deintercalating lithium; and a surface treatment layer disposed on the core, wherein the surface treatment layer includes a lithium-free oxide that has a spinel structure and includes a dopant, wherein the dopant includes at least one selected from fluorine, sulfur, nitrogen, boron, and phosphorous.

According to an aspect of another exemplary embodiment, an electrode includes the composite electrode active material.

According to an aspect of another exemplary embodiment, a lithium battery includes the electrode.

According to an aspect of another exemplary embodiment, a method of preparing a composite electrode active material includes: providing a lithium-free oxide that has a spinel structure and includes a dopant; mixing a core including an electrode active material and the lithium-free oxide including the dopant to form a mixture; and milling the mixture using a dry method to form, on the core, a surface treatment layer including the lithium-free oxide that includes the dopant to prepare the composite electrode active material, wherein the dopant includes at least one selected from fluorine, sulfur, nitrogen, boron, and phosphorous.

BRIEF DESCRIPTION OF THE DRAWINGS

These and/or other aspects will become apparent and more readily appreciated from the following description of the exemplary embodiments, taken in conjunction with the accompanying drawings in which:

FIGS. 3A to 3E are each a graph of counts versus binding energy (electron volts, eV) showing the results of X-ray photoelectron spectroscopy (XPS) analysis of oxides having a spinel structure, which are prepared in Preparation Examples 1 to 4 and Comparative Preparation Example 1;

DETAILED DESCRIPTION

Figure 1:
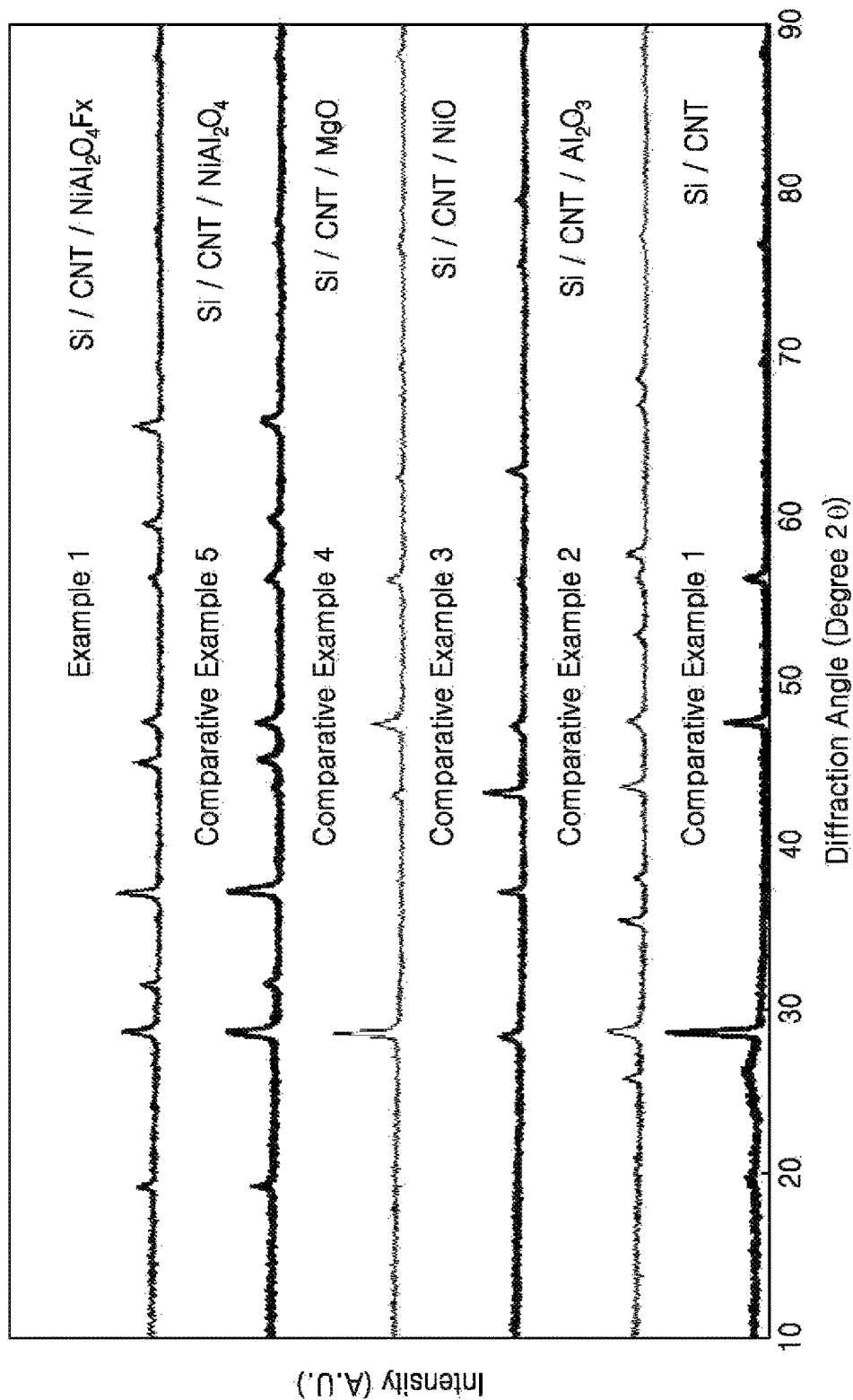
FIG. 1 is a graph of intensity (arbitrary units, a.u.) versus diffraction angle (degrees $2\theta$) showing the results of X-ray diffraction (XRD) analysis of composite negative electrode active materials prepared in Example 1 and Comparative Examples 1 to 5.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Transition metal" as defined herein refers to an element of Groups 3 to 11 of the Periodic Table of the Elements.

"Non-transition metal" refers to elements of the Periodic Table of the Elements which are not transition metals.

"Rare earth" means the fifteen lanthanide elements, i.e., atomic numbers 57 to 71, plus scandium and yttrium.

The "lanthanide elements" means the chemical elements with atomic numbers 57 to 71.

Disclosed is a negative electrode active material which provides improved capacity. The negative electrode active material can be used to provide an improved secondary battery having improved capacity.

While not wanting to be bound by theory, it is understood that in a high capacity negative electrode active material including Si, Sn, or Al, a specific surface is increased due to cracks or the like caused by a volume change during charging/discharging. While not wanting to be bound by theory, it is understood that side reactions occur primarily at surfaces. Therefore, because of the increased surface area of the negative electrode active material, a side reaction between a negative electrode active material and an electrolyte is accelerated after charging and discharging, and the negative electrode active material can be deteriorated. Therefore, there remains a need for a method to prevent or reduce the deterioration of the negative electrode active material.

Hereinafter, according to an exemplary embodiment, a composite electrode active material, an electrode and a lithium battery including the composite electrode active material, and a method of preparing the composite electrode active material are disclosed in further detail.

A composite electrode active material according to an exemplary embodiment includes a core, which is capable of intercalating/deintercalating lithium; and a surface treatment layer disposed on the core. In an embodiment the surface treatment layer is disposed on a portion of the core, e.g., on about 5% to about 95%, about 10% to about 90%, or about 20% to about 80% of a total surface area of the core.

The surface treatment layer may include a lithium-free oxide that has a spinel structure and includes a dopant. As used herein, "lithium free" means that the compound is substantially devoid of lithium, e.g., having a lithium content of less than 1 percent by weight, based on a total weight of the compound. In an embodiment, a lithium content of the lithium-free oxide may be 0.001 weight percent (wt %) to 1 wt %, or 0.01 wt % to 0.1 wt %. As used herein, "spinel structure," as would be understood by an artisan in the solid state sciences, means that the compound is isostructural with spinel, i.e., $MgAl_2O_4$. Examples of the dopant may include at least one selected from fluorine (F), sulfur (S), nitrogen (N), boron (B), and phosphorous (P).

At least a portion of a surface in the core, which is capable of intercalating/deintercalating lithium, is treated with the lithium-free oxide having a spinel structure, and thus the surface treatment layer may be formed on a portion of or on an entirety of the surface of the core. The surface treatment layer may be referred to as a coating layer.

While not wanting to be bound by theory, since the lithium-free oxide having a spinel structure does not intercalate/deintercalate lithium, the lithium-free oxide is understood to not directly contribute to a battery capacity. Therefore, the surface treatment layer including the lithium-free oxide may function as a protective layer for the core. That is, the surface treatment layer may suppress a side reaction between the core and an electrolyte. In addition, the surface treatment layer may prevent a transition metal from flowing out of the core, which is capable of intercalating/deintercalating lithium.

The lithium-free oxide having a spinel structure may include any suitable metal oxide and/or metalloid oxide that includes at least two metals and/or metalloids excluding lithium as long as the metal and/or metalloid oxides have a spinel structure. For example, the lithium-free oxide may comprise at least one selected from Sn, Mg, Mo, Cu, Zn, Ti, Ni, Ca, Fe, V, Pb, Co, Ge, Cd, Hg, Sr, Mn, Al, W, and Be, and may further comprise at least one selected from Mg, Zn, Al, V, Mn, Ga, Cr, Fe, Rh, Ni, In, and Co.

Since the lithium-free oxide having a spinel structure may have a stronger metal-oxygen bond compared to an oxide having a rock salt crystal structure, for example, NaCl, CaO, and FeO, or an oxide having a corundum crystal structure, for example, $Al_2O_3$, $Fe_2O_3$, $FeTiO_3$, and MgO, the lithium-free oxide may form a surface treatment layer that is stable even under a high temperature and high voltage condition.

In addition, the lithium-free oxide having a spinel structure, which is included in the surface treatment layer, may include the dopant. Since the lithium-free oxide having a spinel structure includes the dopant, a crystal structure of the lithium-free oxide may be further stabilized.

Examples of the dopant included in the lithium-free oxide having a spinel structure may include at least one element selected from F, S, N, B, and P. The lithium-free oxide may include any suitable dopant as long as the dopant includes at least one element selected from F, S, N, B, and P and stabilizes a crystal structure of the oxide having the spinel structure. In addition, the lithium-free oxide may additionally include an additional dopant, e.g., a second dopant, in addition to the dopant (i.e., first dopant). Each dopant may independently be present in a surface of the spinel oxide or within the spinel oxide. Each dopant may be additionally inserted into the spinel structure or may substitute for a portion of the oxygen in the spinel structure. However, the dopant is not necessarily limited thereto, and may be included in the spinel structure in any suitable form that is applicable in the art.

In the composite electrode active material, examples of the dopant included in the lithium-free oxide may include at least one selected from $F^-$, $BF_4^-$, and $PF_6^-$, and is not limited thereto. The dopant may include any suitable material as long as the material includes fluorine and is applicable as a dopant in the art.

In the composite electrode active material, as a content of the dopant is increased in the lithium-free oxide, when analyzed by XPS, a binding energy of metals included in the lithium-free oxide may increase. Therefore, the surface treatment layer may be further stabilized by addition of the dopant, as is further illustrated in FIGS. 3A to 3E, for example.

In the composite electrode active material, the content of the dopant in the lithium-free oxide may be about 0.1 mole or less, with respect to 1 mole of the lithium-free oxide. For example, the content of the dopant in the lithium-free oxide may be in the range of about more than 0 mole to about 0.1 mole, with respect to 1 mole of the lithium-free oxide. For example, the content of the dopant in the lithium-free oxide may be in the range of about 0.001 mole to about 0.05 mole, with respect to about 1 mole of the lithium-free oxide. For example, the content of the dopant in the lithium-free oxide may be in the range of more than 0.01 mole to about 0.05 mole, with respect to about 1 mole of the lithium-free oxide. The crystal structure of the spinel oxide may be further stabilized within the foregoing ranges of the content of the dopant.

In the composite electrode active material, examples of the lithium-free oxide including the dopant may include at least one selected from oxides expressed by the following Chemical Formula 1:

$$AM_2O_{4-a}X_a \qquad \text{Chemical Formula 1}$$

wherein $0 < a \leq 0.1$,

A includes at least one selected from tin (Sn), magnesium (Mg), molybdenum (Mo), copper (Cu), zinc (Zn), titanium (Ti), nickel (Ni), calcium (Ca), iron (Fe), vanadium (V), lead (Pb), cobalt (Co), germanium (Ge), cadmium (Cd), mercury (Hg), strontium (Sr), manganese (Mn), aluminum (Al), tungsten (W), and beryllium (Be), M includes at least one selected from Mg, Zn, Al, V, Mn, gallium (Ga), chromium (Cr), Fe, rhodium (Rh), Ni, indium (In), and Co, X includes at least one selected from F, S, N, B, and P, and A is different from M.

Examples of the free-lithium oxide including the dopant may include at least one selected from $SnMg_2O_{4-a}X_a$ ($0<a\leq0.1$), $SnZn_2O_{4-a}X_a$ ($0<a\leq0.1$), $MgAl_2O_{4-a}X_a$ ($0<a\leq0.1$), $MoAl_2O_{4-a}X_a$ ($0<a\leq0.1$), $CuAl_2O_{4-a}X_a$ ($0<a\leq0.1$), $ZnAl_2O_{4-a}X_a$ ($0<a\leq0.1$), $ZnV_2O_{4-a}X_a$ ($0<a\leq0.1$), $TiMn_2O_{4-a}X_a$ ($0<a\leq0.1$), $ZnMn_2O_{4-a}X_a$ ($0<a\leq0.1$), $NiAl_2O_{4-a}X_a$ ($0<a\leq0.1$), $MgGa_2O_{4-a}X_a$ ($0<a\leq0.1$), $ZnGa_2O_{4-a}X_a$ ($0<a\leq0.1$), $CaGa_2O_{4-a}X_a$ ($0<a\leq0.1$), $TiMg_2O_{4-a}X_a$ ($0<a\leq0.1$), $VMg_2O_{4-a}X_a$ ($0<a\leq0.1$), $MgV_2O_{4-a}X_a$ ($0<a\leq0.1$), $FeV_2O_{4-a}X_a$ ($0<a\leq0.1$), $ZnV_2O_{4-a}X_a$ ($0<a\leq0.1$), $MgCr_2O_{4-a}X_a$ ($0<a\leq0.1$), $MnCr_2O_{4-a}X_a$ ($0<a\leq0.1$), $FeCr_2O_{4-a}X_a$ ($0<a\leq0.1$), $CoCr_2O_{4-a}X_a$ ($0<a\leq0.1$), $NiCr_2O_{4-a}X_a$ ($0<a\leq0.1$), $CuCr_2O_{4-a}X_a$ ($0<a\leq0.1$), $ZnCr_2O_{4-a}X_a$ ($0<a\leq0.1$), $CdCr_2O_{4-a}X_a$ ($0<a\leq0.1$), $TiMn_2O_{4-a}X_a$ ($0<a\leq0.1$), $ZnMn_2O_{4-a}X_a$ ($0<a\leq0.1$), $MgFe_2O_{4-a}X_a$ ($0<a\leq0.1$), $TiFe_2O_{4-a}X_a$ ($0<a\leq0.1$), $MnFe_2O_{4-a}X_a$ ($0<a\leq0.1$), $CoFe_2O_{4-a}X_a$ ($0<a\leq0.1$), $NiFe_2O_{4-a}X_a$ ($0<a\leq0.1$), $CuFe_2O_{4-a}X_a$ ($0<a\leq0.1$), $ZnFe_2O_{4-a}X_a$ ($0<a\leq0.1$), $CdFe_2O_{4-a}X_a$ ($0<a\leq0.1$), $AlFe_2O_{4-a}X_a$ ($0<a\leq0.1$), $PbFe_2O_{4-a}X_a$ ($0<a\leq0.1$), $MgCo_2O_{4-a}X_a$ ($0<a\leq0.1$), $TiCo_2O_{4-a}X_a$ ($0<a\leq0.1$), $ZnCo_2O_{4-a}X_a$ ($0<a\leq0.1$), $SnCo_2O_{4-a}X_a$ ($0<a\leq0.1$), $FeNi_2O_{4-a}X_a$ ($0<a\leq0.1$), $GeNi_2O_{4-a}X_a$ ($0<a\leq0.1$), $MgRh_2O_{4-a}X_a$ ($0<a\leq0.1$), $ZnRh_2O_{4-a}X_a$ ($0<a\leq0.1$), $TiZn_2O_{4-a}X_a$ ($0<a\leq0.1$), $SrAl_2O_{4-a}X_a$ ($0<a\leq0.1$), $CrAl_2O_{4-a}X_a$ ($0<a\leq0.1$), $MoAl_2O_{4-a}X_a$ ($0<a\leq0.1$), $FeAl_2O_{4-a}X_a$ ($0<a\leq0.1$), $CoAl_2O_{4-a}X_a$ ($0<a\leq0.1$), $MgGa_2O_{4-a}X_a$ ($0<a\leq0.1$), $ZnGa_2O_{4-a}X_a$ ($0<a\leq0.1$), $MgIn_2O_{4-a}X_a$ ($0<a\leq0.1$), $CaIn_2O_{4-a}X_a$ ($0<a\leq0.1$), $FeIn_2O_{4-a}X_a$ ($0<a\leq0.1$), $CoIn_2O_{4-a}X_a$ ($0<a\leq0.1$), $NiIn_2O_{4-a}X_a$ ($0<a\leq0.1$), $CdIn_2O_{4-a}X_a$ ($0<a\leq0.1$), and $HgIn_2O_{4-a}X_a$ ($0<a\leq0.1$). X in the chemical formulas may include at least one selected from F, S, N, B, and P.

In the composite electrode active material, examples of the lithium-free oxide including the dopant may include at least one selected from oxides expressed by the following Chemical Formula 2:

$$AM_2O_{4-a}F_a \qquad \text{Chemical Formula 2}$$

wherein $0 < a \leq 0.1$,

A includes at least one selected from Sn, Mg, Mo, Cu, Zn, Ti, Ni, Ca, Fe, V, Pb, Co, Ge, Cd, Hg, Sr, Mn, Al, W, and Be, M includes at least one selected from Mg, Zn, Al, V, Mn, Ga, Cr, Fe, Rh, Ni, In, and Co, and A is different from M.

Examples of the lithium-free oxide including the dopant may include at least one selected from $SnMg_2O_{4-a}F_a$ ($0<a\leq0.1$), $SnZn_2O_{4-a}F_a$ ($0<a\leq0.1$), $MgAl_2O_{4-a}F_a$ ($0<a\leq0.1$), $MoAl_2O_{4-a}F_a$ ($0<a\leq0.1$), $CuAl_2O_{4-a}F_a$ ($0<a\leq0.1$), $ZnAl_2O_{4-a}F_a$ ($0<a\leq0.1$), $ZnV_2O_{4-a}F_a$ ($0<a\leq0.1$), $TiMn_2O_{4-a}F_a$ ($0<a\leq0.1$), $ZnMn_2O_{4-a}F_a$ ($0<a\leq0.1$), $NiAl_2O_{4-a}F_a$ ($0<a\leq0.1$), $MgGa_2O_{4-a}F_a$ ($0<a\leq0.1$), $ZnGa_2O_{4-a}F_a$ ($0<a\leq0.1$), $CaGa_2O_{4-a}F_a$ ($0<a\leq0.1$), $TiMg_2O_{4-a}F_a$ ($0<a\leq0.1$), $VMg_2O_{4-a}F_a$ ($0<a\leq0.1$), $MgV_2O_{4-a}F_a$ ($0<a\leq0.1$), $FeV_2O_{4-a}F_a$ ($0<a\leq0.1$), $ZnV_2O_{4-a}F_a$ ($0<a\leq0.1$), $MgCr_2O_{4-a}F_a$ ($0<a\leq0.1$), $MnCr_2O_{4-a}F_a$ ($0<a\leq0.1$), $FeCr_2O_{4-a}F_a$ ($0<a\leq0.1$), $CoCr_2O_{4-a}F_a$ ($0<a\leq0.1$), $NiCr_2O_{4-a}F_a$ ($0<a\leq0.1$), $CuCr_2O_{4-a}F_a$ ($0<a\leq0.1$), $ZnCr_2O_{4-a}F_a$ ($0<a\leq0.1$), $CdCr_2O_{4-a}F_a$ ($0<a\leq0.1$), $TiMn_2O_{4-a}F_a$ ($0<a\leq0.1$), $ZnMn_2O_{4-a}F_a$ ($0<a\leq0.1$), $MgFe_2O_{4-a}F_a$ ($0<a\leq0.1$), $TiFe_2O_{4-a}F_a$ ($0<a\leq0.1$), $MnFe_2O_{4-a}F_a$ ($0<a\leq0.1$), $CoFe_2O_{4-a}F_a$ ($0<a\leq0.1$), $NiFe_2O_{4-a}F_a$ ($0<a\leq0.1$), $CuFe_2O_{4-a}F_a$ ($0<a\leq0.1$), $ZnFe_2O_{4-a}F_a$ ($0<a\leq0.1$), $CdFe_2O_{4-a}F_a$ ($0<a\leq0.1$), $AlFe_2O_{4-a}F_a$ ($0<a\leq0.1$), $PbFe_2O_{4-a}F_a$ ($0<a\leq0.1$), $MgCo_2O_{4-a}F_a$ ($0<a\leq0.1$), $TiCo_2O_{4-a}F_a$ ($0<a\leq0.1$), $ZnCo_2O_{4-a}F_a$ ($0<a\leq0.1$), $SnCo_2O_{4-a}F_a$ ($0<a\leq0.1$), $FeNi_2O_{4-a}F_a$ ($0<a\leq0.1$), $GeNi_2O_{4-a}F_a$ ($0<a\leq0.1$), $MgRh_2O_{4-a}F_a$ ($0<a\leq0.1$), $ZnRh_2O_{4-a}F_a$ ($0<a\leq0.1$), $TiZn_2O_{4-a}F_a$ ($0<a\leq0.1$), $SrAl_2O_{4-a}F_a$ ($0<a\leq0.1$), $CrAl_2O_{4-a}F_a$ ($0<a\leq0.1$), $MoAl_2O_{4-a}F_a$ ($0<a\leq0.1$), $FeAl_2O_{4-a}F_a$ ($0<a\leq0.1$), $CoAl_2O_{4-a}F_a$ ($0<a\leq0.1$), $MgGa_2O_{4-a}F_a$ ($0<a\leq0.1$), $ZnGa_2O_{4-a}F_a$ ($0<a\leq0.1$), $MgIn_2O_{4-a}F_a$ ($0<a\leq0.1$), $CaIn_2O_{4-a}F_a$ ($0<a\leq0.1$), $FeIn_2O_{4-a}F_a$ ($0<a\leq0.1$), $CoIn_2O_{4-a}F_a$ ($0<a\leq0.1$), $NiIn_2O_{4-a}F_a$ ($0<a\leq0.1$), $CdIn_2O_{4-a}F_a$ ($0<a\leq0.1$), and $HgIn_2O_{4-a}F_a$ ($0<a\leq0.1$).

In the composite electrode active material, examples of the lithium-free oxide including the dopant may include at least one selected from $SnMg_2O_{4-a}F_a$ ($0.001\leq a\leq0.05$), $SnZn_2O_{4-a}F_a$ ($0.001\leq a\leq0.05$), $MgAl_2O_{4-a}F_a$ ($0.001\leq a\leq0.05$), $CuAl_2O_{4-a}F_a$ ($0.001\leq a\leq0.05$), $ZnAl_2O_{4-a}F_a$ ($0.001\leq a\leq0.05$), and $NiAl_2O_{4-a}F_a$ ($0.001\leq a\leq0.05$).

In the composite electrode active material, a peak intensity ratio of a peak of crystal surface (111) and a peak of crystal surface (311), that is, I(111)/I(311), may be about 0.2 or more in an X-ray diffraction spectrum of the lithium-free oxide including the dopant. For example, the ratio of I(111)/I(311) may be in the range of about 0.2 to about 0.9, or about 0.3 to about 0.8.

In addition, in the composite electrode active material, a peak intensity ratio of a peak of crystal surface (111) and a peak of crystal surface (400), that is, I(111)/I(400), may be about 0.6 or more in the X-ray diffraction spectrum of the lithium-free oxide including the dopant. For example, the I(111)/I(400) may be in the range of about 0.6 to about 1.5.

In the composite electrode active material, a content of the lithium-free oxide including the dopant may be about 50 wt % or less, with respect to a total weight of an electrode active material. For example, in the composite electrode active material, the content of the lithium-free oxide including the dopant may be about 10 wt % or less, with respect to the total weight of the electrode active material. For example, in the composite electrode active material, the content of the lithium-free oxide including the dopant may be about 5 wt % or less, with respect to the total weight of the electrode active material. For example, in the composite electrode active material, the content of the lithium-free oxide including the dopant may be about 4 wt % or less, with respect to the total weight of the electrode active material. For example, in the composite electrode active material, the content of the lithium-free oxide including the dopant may be about 3 wt % or less, with respect to the total weight of the electrode active material. For example, the content of the lithium-free oxide including the dopant may be in the range of about more than 0 wt % to about 10 wt %, or about 0.001 wt % to about 8 wt %, or about 0.01 wt % to about 4 wt %, with respect to the total weight of the electrode active material. For example, the content of the lithium-free oxide including the dopant may be in the range of about more than 0 wt % to about 5 wt %, with respect to the total weight of the electrode active material.

In the composite electrode active material, the surface treatment layer may include at least two elements selected from metals and metalloids, which have an atomic weight of about 9 atomic mass units (AMU) or more, and the elements may include at least one selected from Sn, Mg, Mo, Cu, Zn, Ti, Ni, Ca, Al, V, Mn, Ga, Fe, Cr, Rh, In, Pb, Co, Ge, Cd, Hg, Sr, W, and Be. In addition, in the composite electrode active material, the surface treatment layer may include at least one dopant selected from F, S, N, B, and P.

A content of the at least two elements in the surface treatment layer may be about 50 wt % or less, with respect to the total weight of the composite electrode active material, wherein the at least two elements are selected from metals and metalloids having an atomic weight of about 9 AMU or more. For example, the content of the at least two elements may be in the range of about more than 0 wt % to about 10 wt % with respect to the total weight of the composite electrode active material. In an embodiment, a content of the at least two elements may be about 0.001 wt % to about 8 wt %, or about 0.01 wt % to about 4 wt %, with respect to the total weight of the composite electrode active material.

In the surface treatment layer, a composition ratio of oxygen to the at least two elements may be in the range of about 4:2.1 to about 4:3.9, the at least two elements being selected from metals and metalloids having an atomic weight of about 9 atomic mass units (AMU) or more. For example, the composition ratio may be in the range of about 4:2.5 to about 4:3.5. For example, the composition ratio may be in the range of about 4:2.9 to about 4:3.1. For example, the composition ratio may be about 4:3. In the lithium-free oxide having an empirical formula $AM_2O_4$ and which can be included in the surface treatment layer, the composition ratio may correspond to a composition ratio of oxygen and (A+M).

In the surface treatment layer, a composition ratio of the dopant and the at least two elements may be in the range of about more than 0:2.1 to about 0.1:3.9, the at least two elements being selected from metals and metalloids having an atomic weight of about 9 AMU or more. For example, the composition ratio may be in the range of about more than 0:2.5 to about 0.1:3.5. For example, the composition ratio may be in the range of about more than 0:2.9 to about 0.1:3.1. For example, the composition ratio may be in the range of about more than 0:1.3 to about 0:3. In the lithium-free oxide having an empirical formula of Chemical Formula 1, i.e., $AM_2O_4X_a$, which may be included in the surface treatment layer, the composition ratio may correspond to a composition ratio of the dopant X and (A+M). For example, the lithium-free oxide may have an empirical formula of Chemical Formula 1, i.e., $AM_2O_4F_a$, and may be included in the surface treatment layer, wherein the composition ratio may correspond to a composition ratio of fluorine and (A+M).

In the composite electrode active material, a thickness of the surface treatment layer may be in the range of about 1 angstrom (Å) to about 1 micrometer (μm). For example, the thickness of the surface treatment layer may be in the range of about 1 nm to about 1 µm. For example, the thickness of the surface treatment layer may be in the range of about 1 nanometer (nm) to about 100 nm. For example, the thickness of the surface treatment layer may be in the range of about 1 nm to about 30 nm. When the foregoing range is used, improved charge/discharge characteristics may be obtained.

The surface treatment layer of the composite electrode active material may completely cover the core or may cover a portion of the core, and may be in the form of an island on the core. In an embodiment the surface treatment layer is present in an amount of about 5% to about 95%, about 10% to about 90%, or about 20% to about 80%, based on a total area of a surface of the core. Since the surface treatment layer covers the at least a portion of the core, a reaction between the core and an electrolyte may be suppressed.

In the composite electrode active material, primary particles of the electrode active material constituting the core may be particles that have an average particle diameter of about 10 nanometers (nm) to about 5 µm. For example, an average particle diameter of the primary particle may be in the range of about 10 nm to about 3 µm. For example, the average particle diameter of the primary particle may be in the range of about 100 nm to about 2 µm. For example, the average particle diameter of the primary particle may be in the range of about 200 nm to about 1 µm. For example, the average particle diameter of the primary particle may be in the range of about 300 nm to about 800 nm. For example, the average particle diameter of the primary particle may be in the range of about 300 nm to about 700 nm. Improved charge/discharge characteristics may be obtained within the foregoing ranges.

In the composite electrode active material, secondary particles of the electrode active material may comprise particles, e.g., primary particles that have an average particle diameter of about 100 nm to about 5 µm, the secondary particles being obtained by agglomerating the primary particles of the electrode active material constituting the core. For example, an average particle diameter of the secondary particle may be in the range of about 500 nm to about 3 µm. For example, the average particle diameter of the secondary particle may be in the range of about 1 µm to about 2 µm. Improved charge/discharge characteristics may be obtained within the ranges.

In the composite electrode active material, the core may include particles that have an average particle diameter of about 10 nm to about 50 µm. For example, the average particle diameter of the core may be in the range of about 100 nm to about 30 µm. For example, the average particle diameter of the core may be in the range of about 1 µm to about 30 µm. Improved charge/discharge characteristics may be obtained within the foregoing ranges. The core may include a secondary particle of the electrode active material, wherein the secondary particle is comprises of primary particles.

In the composite electrode active material, the core, which is capable of charging/discharging lithium, may include a negative electrode active material.

In the composite electrode active material, examples of the negative electrode active material in the core may include at least one selected from lithium metal, a lithium-alloyable metal, a transition metal oxide, and non-transition metal oxide, and are not limited thereto. The negative electrode active material may include any suitable material as long as the material is suitable as a negative electrode active material of a lithium battery.

The lithium-alloyable metal may comprise any suitable metal which can alloy with lithium. For example, the lithium-alloyable metal may include at least one selected from silicon (Si), tin (Sn), aluminum (Al), germanium (Ge), lead (Pb), bismuth (Bi), antimony (Sb), and a Si—Y' alloy (wherein Y' includes at least one selected from an alkali metal, an alkaline earth metal, a Group 13 element, a Group 14 element, a transition metal, and a rare earth element, and does not include Si), or may include an Sn—Y" alloy (wherein Y" includes at least one selected from an alkali metal, an alkaline earth metal, a Group 13 element, a Group 14 element, a transition metal, and a rare earth element, and does not include Sn). The element Y" may include at least one selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium(In), titanium (Ti), germanium (Ge), phosphorus (P), arsenic (As), antimony (Sb), bismuth (Bi), sulfur (S), selenium (Se), tellurium (Te), and polonium (Po).

Examples of the transition metal oxide may include at least one selected from lithium titanium oxide, vanadium oxide, and lithium vanadium oxide.

Examples of the transition metal oxide may include at least one selected from $SnO_2$ and $SiO_x$ (wherein $0<x<2$).

In the composite electrode active material, the core may additionally include a carbon-based material, i.e., a carbonaceous material. For example, the lithium-alloyable metal in the core may form a complex together with the carbon-based material.

The carbon-based material may be a conductive material. Examples of the carbon-based material used as the conductive material may include at least one selected from carbon black, a graphite particle, natural graphite, artificial graphite, acetylene black, Ketjen black, a carbon nanotube, a carbon nano fiber, and a carbon nanorod, and are not limited thereto. The conductive material may include any suitable carbon-based material, for example a carbon-based material is used as a conductive material in the art. For example, since the core includes a fibrous conductive material such as the carbon nanotube, it is possible to prevent a short circuit caused by cracks occurring during charging/discharging of the lithium-alloyable metal.

Alternatively, the carbon-based material may be a negative electrode active material. Examples of the carbon-based material used as the negative electrode active material may include at least one selected from a crystalline carbon, and an amorphous carbon. The crystalline carbon may include a graphite such at least one selected from a plate-shaped, flaky, spherical, and fibrous graphite. The graphite can be a natural graphite or an artificial graphite. The amorphous carbon may include at least one selected from a soft carbon (e.g., a carbon oxidized (e.g., burned) at low temperature), a hard carbon, a mesophase pitch carbide, and an oxidized coke.

In the composite electrode active material, the surface treatment layer may be formed on the surface of the core by mixing the core and the lithium-free oxide having a spinel structure and including the dopant, and applying mechanical energy to the resultant mixture using a dry method.

In the composite electrode active material, the core capable of intercalating/deintercalating lithium may include a positive electrode active material. The positive electrode active material may include lithium transition metal oxide.

The positive electrode active material may include any suitable lithium transition metal oxide. For example, the lithium transition metal oxide may have a spinel structure or a layered structure.

The lithium transition metal oxide may be a single composition and may be a complex of compounds having at least two chemical compositions. For example, the lithium transition metal oxide may be a complex of at least two compounds, each having a layered structure. Alternatively, the lithium transition metal oxide may be a complex of a compound having a layered structure and a compound having a spinel structure.

Examples of the lithium transition metal oxide may include at least one selected from an overlithiated oxide (OLO) and lithium transition metal oxide having an average operating voltage of about 4.3 V or more. For example, the average operating voltage of the lithium transition metal oxide may be in the range of about 4.3 V to about 5.0 V.

The average operating voltage may mean a value obtained by dividing charge/discharge electric energy by a charge/discharge quantity of electricity when a battery is charged and discharged to an upper limit and a lower limit of a charge/discharge voltage at a selected operating voltage of the battery.

In the composite electrode active material, the core may include, for example, compounds expressed by the following Chemical Formulas 3 and 4:

$$Li[Li_aMe_{1-a}]O_{2+d} \quad \text{Chemical Formula 3}$$

$$Li[Li_bMe_cM'_e]O_{2+d} \quad \text{Chemical Formula 4}$$

wherein 0<a<1, b+c+e=1 (0<b<1, and 0<e<0.1), 0≤d≤0.1, Me includes at least one selected from Ti, V, Cr, Mn, Fe, Co, Ni, Cu, Al, Mg, Zr, and B, and M' includes at least one selected from Mo, W, Ir, Ni, and Mg. For example, 0<a<0.33.

In addition, in the composite electrode active material, the core may include compounds expressed by the following Chemical Formulas 5 to 9:

$$Li_xCo_{1-y}My O_{2-\alpha}X_\alpha \quad \text{Chemical Formula 5}$$

$$Li_xCo_{1-y-z}Ni_yMzO_{2-\alpha}X_\alpha \quad \text{Chemical Formula 6}$$

$$Li_xMn_{2-y}MyO_{4-\alpha}X_\alpha \quad \text{Chemical Formula 7}$$

$$Li_xCo_{2-y}MyO_{4-\alpha}X_\alpha \quad \text{Chemical Formula 8}$$

$$Li_xMe_yM_zPO_{4-\alpha}X_\alpha, 1 \quad \text{Chemical Formula 9}$$

wherein 0.90≤x≤1.1, 0≤y≤0.9, 0≤z≤0.5, (1-y-z)>0, 0≤α≤2, Me includes at least one selected from Ti, V, Cr, Mn, Fe, Co, Ni, Cu, Al, Mg, Zr, and B, M includes at least one selected from Mg, Ca, Sr, Ba, Ti, Zr, Nb, Mo, W, Zn, Al, Si, Ni, Mn, Cr, Fe, Mg, Sr, V, and a rare-earth element, and X includes at least one selected from O, F, S, and P.

In addition, in the composite electrode active material, the core may include compounds expressed by the following Chemical Formulas 10 and 11:

$$pLi_2MO_{3-(1-p)}LiMeO_2 \quad \text{Chemical Formula 10}$$

$$xLi_2MO_{3-y}LiMeO_{2-z}Li_{1+d}M'_{2-d}O_4 \quad \text{Chemical Formula 11}$$

wherein 0<p<1, x+y+z=1, 0<x<1, 0<y<1, 0<z1, 0≤d≤0.33, M includes at least one selected from Mg, Ca, Sr, Ba, Ti, Zr, Nb, Mo, W, Zn, Al, Si, Ni, Mn, Cr, Fe, Mg, Sr, V, and a rare-earth element, Me includes at least one selected from Ti, V, Cr, Mn, Fe, Co, Ni, Cu, Al, Mg, Zr, and B, and M" includes at least one selected from Ti, V, Cr, Mn, Fe, Co, Ni, Cu, Al, Mg, Zr, and B.

The compound expressed by Chemical Formula 10 may have a layered structure, and $Li_2MO_{3-y}LiMeO_2$ and $Li_{1+d}M'_{2-d}O_4$ in the compound expressed by Chemical Formula 11 may respectively have a layered structure and a spinel structure.

An electrode according to some exemplary embodiments may include the above-described composite electrode active material. The electrode may be a cathode or an anode.

The cathode may be prepared as follows.

A positive electrode active material composition may be prepared by mixing a conductive material, a binder, a solvent, and a positive electrode active material on at least a portion of a surface of which a surface treatment layer is formed, the surface treatment layer including lithium-free oxide that has a spinel structure and includes a dopant. A cathode plate, in which a positive electrode active material layer is formed, may be prepared by directly coating the positive electrode active material composition on an aluminum collector and drying the resultant structure. Alternatively, the cathode plate, in which the positive electrode active material layer is formed, may be prepared by casting the positive electrode active material composition on a separate support and laminating a film peeled from the separate support on the aluminum collector.

Examples of the conductive material may include at least one selected from carbon black, a graphite particle, natural graphite, artificial graphite, acetylene black, Ketjen black, and carbon fiber; a metal powder, a metal fiber, or a metal tube such as a carbon nanotube, copper, nickel, aluminum, and silver; and a conductive polymer such as a polyphenylene derivative. However, the conductive material is not limited thereto and may include any suitable material applicable as a conductive material in the art.

Examples of the binder may include one selected from a vinylidene fluoride/hexafluoropropylene copolymer, polyvinylidene fluoride, polyacrylonitrile, poly(methyl methacrylate), polytetrafluoroethylene (PTFE), mixtures of the foregoing polymers, and a styrene butadiene rubber polymer, and examples of the solvent may include at least one selected from N-methylpyrrolidone (NMP), acetone, and water. However, the binder and the solvent are not limited thereto and may include any suitable material applicable in the art. A content of each of the positive electrode active material, the conductive material, the binder, and the solvent may be a content commonly used in a lithium battery.

The anode may be prepared in the same manner as the cathode except that a negative electrode active material is used instead of the positive electrode active material.

For example, the anode may be prepared as follows.

As in the preparing of the cathode, a negative electrode active material composition may be prepared by mixing a conductive material, a binder, a solvent, and a negative electrode active material on at least a portion of a surface of which a surface treatment layer is formed, the surface treatment layer including the lithium-free oxide that has a spinel structure and includes a dopant. An anode plate may be prepared by directly coating the negative electrode active material composition on a copper collector. Alternatively, the anode plate may be prepared by casting the negative electrode active material composition on a separate support and laminating an anode electrode active material film peeled from the separate support on the copper collector.

The conductive material, the binder, and the solvent of the negative electrode active material composition may be substantially the same as the conductive material, the binder, the solvent of the cathode. In some cases, it is possible to form pores in the cathode and anode plates by further adding a plasticizer in the positive and negative electrode active material compositions.

A content of each of the negative electrode active material, the conductive material, the binder, and the solvent may be a content commonly used in a lithium battery. According to a structure and use of a lithium battery, one or more of the conductive material, the binder, and the solvent may be omitted.

In addition, a lithium battery according to an exemplary embodiment may include the above-described electrode. For example, the lithium battery may be manufactured as follows.

As described above, a cathode and an anode according to an exemplary embodiment may be prepared. At least one of the cathode and anode may include an electrode active material in which a surface treatment layer is formed on a core capable of intercalating and deintercalating lithium, the surface treatment layer including lithium-free oxide that has a spinel structure and includes a dopant.

A separator to be inserted between the cathode and the anode may be prepared. The separator may include any suitable material applicable to a lithium battery. The separator may include a material that has a low resistance to an ion movement of an electrolyte and has an excellent ability in containing an electrolyte solution. Examples of the separator may include at least one selected from a glass fiber, polyester, Teflon, polyethylene, polypropylene, and polytetrafluoroethylene (PTFE), and may be a non-woven fiber-type or woven fiber-type separator. For example, a windable separator such as polyethylene and polypropylene may be used for a lithium ion battery, and a separator having an excellent ability in containing an organic electrolyte solution may be used for a lithium ion polymer battery. For example, the separator may be prepared as follows.

A separator composition may be prepared by mixing a polymer resin, a filler, and a solvent. The separator may be prepared by directly coating the separator composition on an electrode and drying the resultant structure. Alternatively, the separator may be prepared by casting the separator composition on a support, drying the resultant structure, and laminating a separator film peeled from the support on the electrode.

The polymer resin used for preparing the separator is not particularly limited and may include any suitable material applicable as a bonding material of an electrode plate. Examples of the polymer resin may include at least one selected from a vinylidene fluoride/hexafluoropropylene copolymer, polyvinylidene fluoride (PVDF), polyacrylonitrile, and poly(methyl methacrylate).

An electrolyte may be prepared.

For example, the electrolyte may be an organic electrolyte solution. In addition, the electrolyte may be a solid. Examples of the electrolyte may include at least one selected from boron oxide and lithium oxide but are not limited thereto. The electrolyte may include any suitable material applicable as a solid electrolyte in the art. The solid electrolyte may be formed on the anode by using a sputtering process or the like.

For example, the organic electrolyte solution may be prepared. The organic electrolyte solution may be prepared by dissolving a lithium salt in an organic solvent.

The organic solvent may include any suitable material applicable as an organic solvent in the art. Examples of the organic solvent may include at least one selected from propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulfolane, dichloroethane, chlorobenzene, nitrobenzene, diethylene glycol, and dimethyl ether.

The lithium salt may include any suitable material applicable as a lithium salt in the art. Examples of the lithium salt may include one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, and mixtures thereof.

Figure 5:
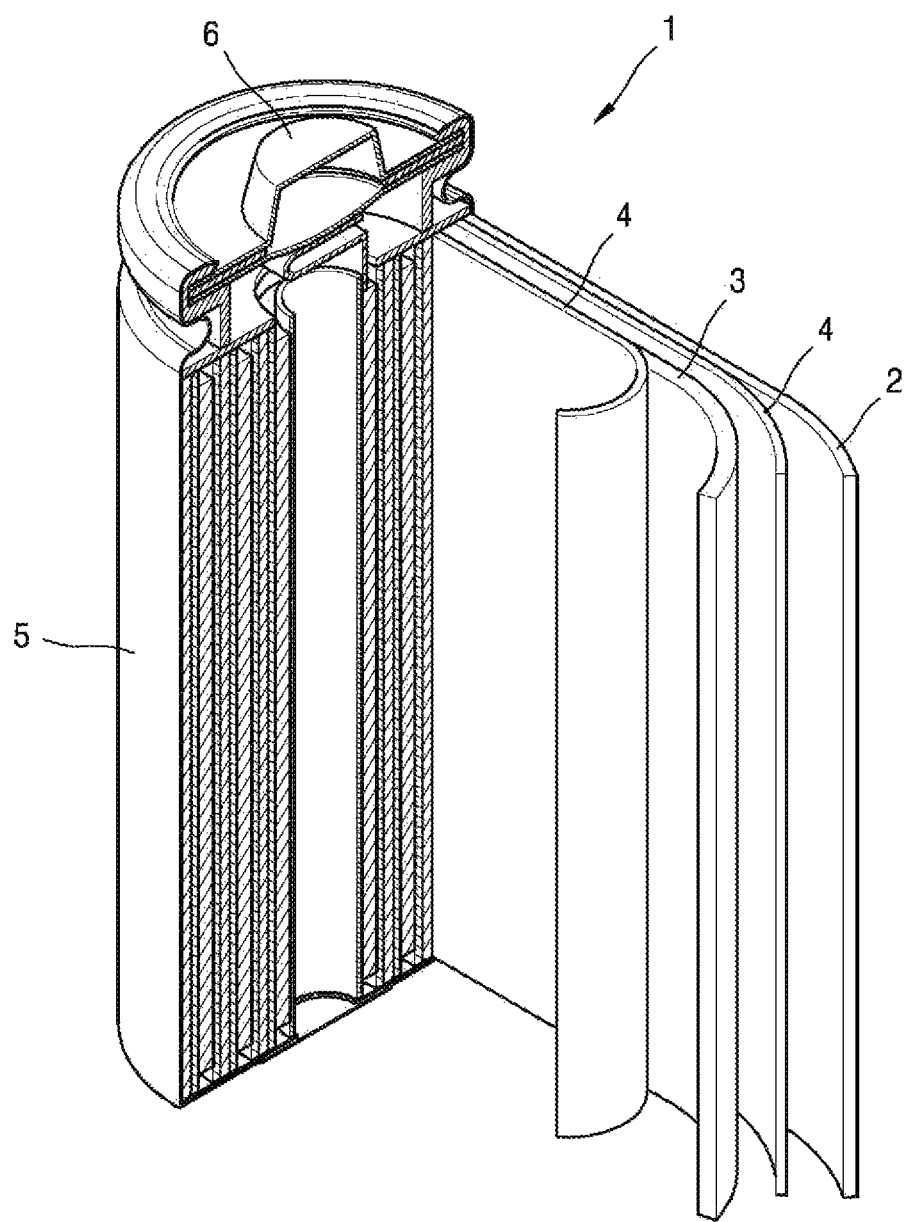
FIG. 5 is a schematic diagram of a lithium battery according to an exemplary embodiment.

As illustrated in FIG. 5, a lithium battery 1 may include a cathode 3, an anode 2, and a separator 4. The cathode 3, the anode 2, and the separator 4 may be wound or folded to be encased in a battery case 5. An organic electrolyte solution may be injected into the battery case 5, and the battery case 5 may be sealed with a cap assembly 6 to manufacture the lithium battery 1. The battery case 5 may have a cylindrical shape, a square shape, or a thin film shape. For example, the lithium battery 1 may be a large thin film type battery. The lithium battery 1 may be a lithium ion battery.

A battery structure may be formed by disposing the separator 4 between the cathode 3 and the anode 2. A lithium ion polymer battery may be manufactured by laminating the battery structure in a bicell structure, impregnating the laminated battery structure into an organic electrolyte solution, accommodating the resultant structure in a pouch, and sealing the pouch.

In addition, a battery pack may be formed by laminating a plurality of battery structures. The battery pack may be used in all devices requiring high capacity and high output, for example, notebooks, smartphones, and electric vehicles.

In addition, since the lithium battery has excellent storage stability at a high temperature, superior battery life characteristics, and a high rate capability, the lithium battery may be used in electric vehicles (EV). For example, the lithium battery may be used in hybrid vehicles such as a plug-in hybrid electric vehicle (PHEV).

A method of preparing a composite electrode active material according to an exemplary embodiment may include preparing a lithium-free oxide that has a spinel structure and includes a dopant; mixing a core including an electrode active material and the lithium-free oxide including the dopant; and forming, on the core, a surface treatment layer including the lithium-free oxide that includes the dopant, by using a dry method. Examples of the dopant may include at least one selected from F, S, N, B, and P.

In the method of preparing the composite electrode active material, the dry method may include any suitable method of forming the surface treatment layer by applying mechanical energy to a mixture of the core including the electrode active material and the lithium-free oxide having a spinel structure without using a solvent.

For example, the dry method may include a) a method of contacting and attaching particles of a covering material, for example, a dopant-containing oxide having a spinel structure, on surfaces of core particles by using a low speed ball mill and simultaneously, agglomerating the attached particles of the covering material to each other to form a surface treatment layer, b) a method of confining particles of a covering material on surfaces of core particles and bonding the core particle and the particles of the covering material using a pulverizing medium or rotation of a rotator disposed within an apparatus, and simultaneously, mechanically bonding the particles of the covering material to each other on the core particles by using stress caused by the particles of the covering material or bonding the particles of the covering material to each other by softening or fusing a surface treatment layer including the particles of the covering material on the core particles by using heat generated by the stress, or c) a method of fusing a portion of or the whole core and the surface treatment layer by heat-treating the core covered with the surface treatment layer formed according to the method a) and/or b) and then re-cooling a portion of or the whole core and the surface treatment layer. The dry method may include any dry method applicable in the art.

For example, the dry method may include at least one selected from a planetary ball mill method, a low-speed ball mill method, a high-speed ball mill method, a hybridization method, and a mechanofusion method. For example, the mechanofusion method may be used. The mechanofusion method may be a method of introducing a mixture into a container that rotates, fixing the mixture to an inner wall of the container, and compressing the mixture in a gap between the inner wall of the container and an arm head spaced apart from the inner wall of the container by a slight gap. The mechanofusion method may correspond to the method b).

The method of preparing the composite electrode active material may further include, after forming the surface treatment layer by using the dry method, heat-treating the resultant structure in which the surface treatment layer is formed. The surface treatment layer may be further stabilized through the heat-treating. The heat-treating may be performed under any condition capable of fusing a portion of or the whole surface treatment layer.

In the method of preparing the composite electrode active material, a content of the lithium-free oxide may be about 50 wt % or less with respect to the total weight of the core and the lithium-free oxide including the dopant. For example, the content of the lithium-free oxide including the dopant may be about 10 wt % or less with respect to the total weight of the core and the lithium-free oxide including the dopant. For example, the content of the lithium-free oxide including the dopant may be about 5 wt % or less with respect to the total weight of the core and the lithium-free oxide including the dopant. For example, the content of the lithium-free oxide including the dopant may be about 3 wt % or less with respect to the total weight of the core and the lithium-free oxide including the dopant. For example, the content of the lithium-free oxide including the dopant may be about 2 wt % or less with respect to the total weight of the core and the lithium-free oxide including the dopant. For example, the content may be in the range of about more than 0 wt % to about 10 wt %. For example, the content may be in the range of about more than 0 wt % to about 5 wt %.

For example, the preparing of the lithium-free oxide including the dopant may include preparing a mixture by milling a lithium-free oxide precursor and a dopant precursor; and preparing the lithium-free oxide including the dopant by sintering the mixture.

In the preparing of the mixture by milling the lithium-free oxide precursor and the dopant precursor, an intermediate phase may be formed by treating the lithium-free oxide precursor and the dopant precursor using a ball mill or the like to pre-react the lithium-free oxide precursor and the dopant precursor together. The intermediate phase may be a phase that includes an oxide including at least two transition metals.

Since the mixture includes the intermediate phase, during the sintering, various secondary phases, for example, impurity phases due to volatilization of ZnO may be prevented from being formed. That is, due to the formation of the intermediate phase, a lithium-free oxide, from which the impurity phases are removed, may be prepared even when the sintering is performed at a high temperature, the lithium-free oxide including a dopant and having a spinel structure. In addition, the crystalline properties of the lithium-free oxide including the dopant may be improved by the sintering that is performed at a high temperature.

Alternatively, the preparing of the lithium-free oxide including the dopant may include preparing a mixture by milling a lithium-free oxide precursor and a dopant precursor; and preparing the lithium-free oxide including the dopant by sintering the mixture. That is, the lithium-free oxide including the dopant may be prepared by preparing lithium-free oxide and then, mixing the prepared lithium-free oxide and the dopant precursor and sintering the mixture.

The method of preparing the composite electrode active material may further include, after preparing the lithium-free oxide that has a spinel structure and includes the dopant, pulverizing the prepared lithium-free oxide including the dopant. Nanoparticles of the lithium-free oxide including the dopant may be prepared through the pulverizing. The nanoparticles may have a particle diameter of about 10 nm to about 1000 nm.

The sintering of the mixture of the lithium-free oxide precursor and the dopant precursor or the mixture of the lithium-free oxide and the dopant precursor may be performed at a high temperature of about 700° C. to about 1,500° C. For example, the sintering may be performed at a high temperature of about 1000° C. to about 1400° C.

The sintering of the mixture may be performed at a high temperature, thereby easily controlling physical properties of a surface treatment material. A sintering temperature may be easily adjusted, thereby easily adjusting a content or the like of impurities.

The sintering of the mixture may be performed for about 12 hours to about 72 hours. For example, the sintering may be performed for about 24 hours to about 60 hours. For example, the sintering may be performed for about 36 hours to about 60 hours.

The sintering may be performed in an oxygen, air, or nitrogen atmosphere. For example, the sintering may be performed in the air atmosphere.

Hereinafter, the present disclosure will be described in more detail through examples and comparative examples. However, the examples are merely for illustrative purposes and are not intended to limit the scope of the inventive concept.

EXAMPLES (Preparation of lithium-free oxide having a spinel structure)

Preparation Example 1: Spinel Oxide Doped with about 0.05 Mol % of F (Mixing of Oxide and F Precursor)

Nickel(II) oxide (NiO manufactured by Sigma Aldrich) and aluminum oxide ($Al_2O_3$ manufactured by Sigma Aldrich) were mixed in a composition ratio of about 1:1 and the resultant mixture was milled at a speed of about 300 rpm to about 500 rpm for about 5 hours by using a planetary ball mill (Planetary mono mill 6 manufactured by Fritsch). $NiAl_2O_4$ having a spinel structure was prepared by oxidizing the milled mixture by burning at a temperature of about 1,200° C. for about 48 hours in an air atmosphere. $NiAl_2O_4$ nanoparticles having a particle diameter of about 100 nm were prepared by pulverizing the $NiAl_2O_4$ for about 1 hour by using a paint shaker.

The prepared $NiAl_2O_4$ nanoparticles and ammonium fluoride ($NH_4F$) were mixed in a composition ratio (molar ratio) of about 1:0.005, and the resultant mixture was milled at a speed of about 300 rpm to about 500 rpm for about 5 hours by using the planetary ball mill (Planetary mono mill 6 manufactured by Fritsch). $NiAl_2O_{3.995}F_{0.005}$, which had a spinel structure and was doped with F, was prepared by oxidizing the milled mixture by burning at a temperature of about 1,200° C. for about 48 hours in an air atmosphere.

Preparation Example 2: Spinel Oxide Doped with about 1 Mol % of F (Mixing of Oxide and F Precursor)

Spinel oxide doped with F was prepared in the same manner as Preparation Example 1 except that $NiAl_2O_{3.99}F_{0.01}$ was prepared by mixing $NiAl_2O_4$ and ammonium fluoride ($NH_4F$) in a composition ratio (molar ratio) of about 1:0.01.

Preparation Example 3: Spinel Oxide Doped with about 2 Mol % of F (Mixing of Oxide and F Precursor)

Spinel oxide doped with F was prepared in the same manner as Preparation Example 1 except that $NiAl_2O_{3.98}F_{0.02}$ was prepared by mixing $NiAl_2O_4$ and ammonium fluoride ($NH_4F$) in a composition ratio (molar ratio) of about 1:0.02.

Preparation Example 4: Spinel Oxide Doped with about 5 Mol % of F (Mixing of Oxide and F Precursor)

Spinel oxide doped with F was prepared in the same manner as Preparation Example 1 except that $NiAl_2O_{3.95}F_{0.05}$ was prepared by mixing $NiAl_2O_4$ and ammonium fluoride ($NH_4F$) in a composition ratio (molar ratio) of about 1:0.05.

Preparation Example 5: Spinel Oxide Doped with about 20 Mol % of F (Mixing of Oxide and F Precursor)

A spinel oxide doped with F was prepared in the same manner as Preparation Example 1 except that $NiAl_2O_{3.8}F_{0.2}$ was prepared by mixing $NiAl_2O_4$ and ammonium fluoride ($NH_4F$) in a composition ratio (molar ratio) of about 1:0.2.

Preparation Example 6: Spinel Oxide Doped with F (Mixing of Oxide Precursor and F Precursor)

Nickel(II) oxide (NiO manufactured by Sigma Aldrich), aluminum oxide ($Al_2O_3$ manufactured by Sigma Aldrich), and ammonium fluoride (NH4F) were mixed in a composition ratio of about 1:1:0.005, and the resultant mixture was milled at a speed of about 300 rpm to about 500 rpm for about 5 hours by using a planetary ball mill (Planetary mono mill 6 manufactured by Fritsch). $NiAl_2O_{3.995}F_{0.005}$, which had a spinel structure and was doped with F, was prepared by oxidizing the milled mixture by burning at a temperature of about 1,200° C. for about 48 hours in an air atmosphere. $NiAl_2O_{3.995}F_{0.005}$ nanoparticles having a particle diameter of about 100 nm were prepared by pulverizing the $NiAl_2O_{3.995}F_{0.005}$ for about 1 hour by using a paint shaker.

Comparative Preparation Example 1: Spinel Oxide Undoped with F

Nickel(II) oxide (NiO manufactured by Sigma Aldrich) and aluminum oxide ($Al_2O_3$ manufactured by Sigma Aldrich) were mixed in a composition ratio of about 1:1, and the resultant mixture was milled at a speed of about 300 rpm to about 500 rpm for about 5 hours by using a planetary ball mill (Planetary mono mill 6 manufactured by Fritsch). $NiAl_2O_4$ having a spinel structure was prepared by oxidizing the milled mixture by burning at a temperature of about 1,200° C. for about 48 hours in an air atmosphere. $NiAl_2O_4$ nanoparticles having a particle diameter of about 100 nm were prepared by pulverizing the $NiAl_2O_4$ for about 1 hour by using a paint shaker.

(Preparation of surface-treated negative electrode active material)

Example 1: Doping about 1 Mole % of F, that is, about 50 Parts by Weight

Si nanoparticles with an average diameter of about 500 nm, carbon nanotubes (CNT with an average diameter of about 20 nm and a length of about 1 μm to about 25 μm manufactured by CNT Co. Ltd), and the $NiAl_2O_{3.99}F_{0.01}$ nanoparticles prepared in Preparation Example 2 were prepared in a weight ratio of about 35:15:50, the Si nanoparticles being prepared by pulverizing butanol and Si (SIE23PB with an average particle diameter of about 5 μm manufactured by Kojundo Chemical) by using a planetary ball mill (Planetary mono mill 6 manufactured by Fritsch).

A first mixture was prepared by introducing the Si nanoparticles and the carbon nanotubes into a mortar and mixing the Si nanoparticles and the carbon nanotubes.

A Si-carbon nanotube composite was prepared by introducing the first mixture into a mixer (SPEX 8000M manufactured by Spex SamplePrep LLC in USA) disposed in a glove box and milling the first mixture for about 1 hour.

A second mixture was prepared by introducing the Si-carbon nanotube composite and the $NiAl_2O_{3.99}F_{0.01}$ nanoparticles prepared in Preparation Example 2 into the mortar and mixing the Si-carbon nanotube composite and the $NiAl_2O_{3.99}F_{0.01}$ nanoparticles.

A composite negative electrode active material, in which a surface treatment layer including $NiAl_2O_{3.99}F_{0.01}$ was formed on a Si-carbon nanotube composite core, was prepared by introducing the second mixture into the mixer (SPEX 8000M manufactured by Spex SamplePrep LLC in USA) disposed in the glove box and milling the second mixture for about 10 minutes.

Example 2: Doping about 2 Mole % of F, that is, about 50 Parts by Weight

A composite negative electrode active material was prepared in the same manner as Example 1 except that the $NiAl_2O_{3.98}F_{0.02}$ prepared in Preparation Example 3 was used instead of the $NiAl_2O_{3.99}F_{0.01}$ nanoparticles prepared in Preparation Example 2.

Example 3: Doping about 1 Mole % of F, that is, about 2 Parts by Weight

Si nanoparticles with an average diameter of about 500 nm, carbon nanotubes (CNT with an average diameter of about 20 nm and a length of about 1 μm to about 25 μm manufactured by CNT Co. Ltd), and the $NiAl_2O_{3.99}F_{0.01}$ nanoparticles prepared in Preparation Example 2 were prepared in a weight ratio of about 68.6:29.4:2.0, the Si nanoparticles being prepared by pulverizing butanol and Si (SIE23PB with an average particle diameter of about 5 μm manufactured by Kojundo Chemical) by using a planetary ball mill (Planetary mono mill 6 manufactured by Fritsch).

A first mixture was prepared by introducing the Si nanoparticles and the carbon nanotubes into a mortar and mixing the Si nanoparticles and the carbon nanotubes.

A Si-carbon nanotube composite was prepared by introducing the first mixture into a mixer (SPEX 8000M manufactured by Spex SamplePrep LLC in USA) disposed in a glove box and milling the first mixture for about 1 hour.

A second mixture was prepared by introducing the Si-carbon nanotube composite and the $NiAl_2O_{3.99}F_{0.01}$ nanoparticles prepared in Preparation Example 2 into the mortar and mixing the Si-carbon nanotube composite and the $NiAl_2O_{3.99}F_{0.01}$ nanoparticles.

A composite negative electrode active material, in which a surface treatment layer including $NiAl_2O_{3.99}F_{0.01}$ was formed on a Si-carbon nanotube composite core, was prepared by introducing the second mixture into the mixer (SPEX 8000M manufactured by Spex SamplePrep LLC in USA) disposed in the glove box and milling the second mixture for about 10 minutes.

Example 4: Doping about 2 Mole % of F, that is, about 2 Parts by Weight

A composite negative electrode active material was prepared in the same manner as Example 3 except that the $NiAl_2O_{3.98}F_{0.02}$ prepared in Preparation Example 3 was used instead of the $NiAl_2O_{3.99}F_{0.01}$ nanoparticles prepared in Preparation Example 2.

Example 5: Doping about 5 Mole % of F, that is, about 2 Parts by Weight

A composite negative electrode active material was prepared in the same manner as Example 3 except that the $NiAl_2O_{3.95}F_{0.05}$ prepared in Preparation Example 4 was used instead of the $NiAl_2O_{3.99}F_{0.01}$ nanoparticles prepared in Preparation Example 2.

Example 6: Doping about 20 Mole % of F, that is, about 2 Parts by Weight

A composite negative electrode active material was prepared in the same manner as Example 3 except that the $NiAl_2O_{3.8}F_{0.2}$ prepared in Preparation Example 5 was used instead of the $NiAl_2O_{3.99}F_{0.01}$ nanoparticles prepared in Preparation Example 2.

Comparative Example 1: Si/CNT

Si nanoparticles with an average diameter of about 500 nm and carbon nanotubes (CNT with an average diameter of about 20 nm and a length of about 1 μm to about 25 μm manufactured by CNT Co. Ltd) were prepared in a weight ratio of about 85:15, the Si nanoparticles being prepared by pulverizing butanol and Si (SIE23PB with an average particle diameter of about 5 μm manufactured by Kojundo Chemical) by using a planetary ball mill (Planetary mono mill 6 manufactured by Fritsch).

A mixture was prepared by introducing the Si nanoparticles and the carbon nanotubes into a mortar and mixing the Si nanoparticles and the carbon nanotubes. A Si-carbon nanotube composite negative electrode active material was prepared by introducing the mixture into a mixer (SPEX 8000M manufactured by Spex SamplePrep LLC in USA) disposed in a glove box and milling the mixture for about 1 hour, and the Si-carbon nanotube composite negative electrode active material was used as it is.

Comparative Example 2: Si/CNT/Al$_2$O$_3$

Si nanoparticles with an average diameter of about 500 nm, carbon nanotubes (CNT with an average diameter of about 20 nm and a length of about 1 μm to about 25 μm manufactured by CNT Co. Ltd), and $Al_2O_3$ nanoparticles were prepared in a weight ratio of about 35:15:50, the Si nanoparticles being prepared by pulverizing butanol and Si (SIE23PB with an average particle diameter of about 5 μm manufactured by Kojundo Chemical) by using a planetary ball mill (Planetary mono mill 6 manufactured by Fritsch).

A first mixture was prepared by introducing the Si nanoparticles and the carbon nanotubes into a mortar and mixing the Si nanoparticles and the carbon nanotubes.

A Si-carbon nanotube composite was prepared by introducing the first mixture into a mixer (SPEX 8000M manufactured by Spex SamplePrep LLC in USA) disposed in a glove box and milling the first mixture for about 1 hour.

A second mixture was prepared by introducing the Si-carbon nanotube composite and the $Al_2O_3$ nanoparticles into the mortar and mixing the Si-carbon nanotube composite and the $Al_2O_3$ nanoparticles.

A composite negative electrode active material, in which a surface treatment layer including $Al_2O_3$ was formed on a Si-carbon nanotube composite core, was prepared by introducing the second mixture into the mixer (SPEX 8000M manufactured by Spex SamplePrep LLC in USA) disposed in the glove box and milling the second mixture for about 10 minutes, and the composite negative electrode active material was used as it is.

Comparative Example 3: Si/CNT/NiO

A composite negative electrode active material, in which a surface treatment layer including NiO was formed, was prepared in the same manner as Comparative Example 2 except that NiO nanoparticles were used instead of the $Al_2O_3$ nanoparticles, and the composite negative electrode active material was used as it is.

Comparative Example 4: Si/CNT/MgO

A composite negative electrode active material, in which a surface treatment layer including MgO was formed, was prepared in the same manner as Comparative Example 2 except that MgO nanoparticles were used instead of the $Al_2O_3$ nanoparticles, and the composite negative electrode active material was used as it is.

Comparative Example 5: Si/CNT/NiAl$_2$O$_4$

A composite negative electrode active material, in which a surface treatment layer including $NiAl_2O_4$ was formed, was prepared in the same manner as Comparative Example 2 except that the NiAl$_2$O$_4$ nanoparticles prepared in Comparative Preparation Example 1 were used instead of the Al$_2$O$_3$ nanoparticles, and the composite negative electrode active material was used as it is.

Comparative Example 6: Si/CNT/MgAl$_2$O$_4$

A composite negative electrode active material, in which a surface treatment layer including MgAl$_2$O$_4$ with a spinel structure was formed, was prepared in the same manner as Comparative Example 2 except that MgAl$_2$O$_4$ nanoparticles having a spinel structure were used instead of the Al$_2$O$_3$ nanoparticles, and the composite negative electrode active material was used at it is.

Comparative Example 7: Si/CNT/NiAl$_2$O$_4$ at about 2 Parts by Weight

A composite negative electrode active material, in which a surface treatment layer including NiAl$_2$O$_4$ was formed, was prepared in the same manner as Example 3 except that the NiAl$_2$O$_4$ prepared in Comparative Preparation Example 1 was used instead of the NiAl$_2$O$_{3.99}$F$_{0.01}$ nanoparticles prepared in Preparation Example 2.

(Preparation of Anode)

Example 7

A slurry was prepared by mixing the composite negative electrode active material prepared in Example 1 and a polyacrylic acid lithium salt in a weight ratio of about 80:20 in an agate mortar. An anode plate, in which an negative electrode active material layer was formed, was prepared by applying the slurry with a thickness of about 20 μm using a doctor blade on a copper foil collector having a thickness of about 15 μm, drying the resultant structure at a temperature of about 80° C., and vacuum-drying the resultant structure at a temperature of about 200° C.

Examples 8 to 12

Anode plates were prepared in the same manner as Example 7 except that the composite negative electrode active materials of Examples 2 to 6 were respectively used.

Comparative Examples 8 to 14

Anode plates were prepared in the same manner as Example 7 except that the composite negative electrode active materials of Examples 1 to 7 were respectively used.

(Manufacture of Lithium battery)

Example 13

A coin cell (2032 size) was manufactured by using the anode plate prepared in Example 7, using a lithium metal as a counter electrode, and using, as an electrolyte, a solution in which a PTFE separator and about 1.3 M of LiPF$_6$ are dissolved in ethylene carbonate (EC)+diethyl carbonate (DEC)+fluoroethylene carbonate (FEC) having a volume ratio of about 2:6:2.

Examples 14 to 18

Lithium batteries were prepared in the same manner as Example 13 except that the anode plates prepared in Examples 8 to 12 were respectively used.

Comparative Examples 15 to 21

Lithium batteries were prepared in the same manner as Example 13 except that the anode plates prepared in Comparative Examples 8 to 14 were respectively used.

Evaluation Example 1: XRD Experiment (1)

XRD experiments were performed on the composite negative electrode active materials prepared in Example 1 and Comparative Examples 1 to 5, and the experiment results were shown in FIG. 1. An XRD was measured by using a Cu-Kα ray.

As shown in FIG. 1, a characteristic peak corresponding to a NiAl$_2$O$_4$ spinel structure appeared in Comparative Example 5 and Example 1, which included spinel oxide, but the spinel structure did not appear in Comparative Examples 1 to 4.

Evaluation Example 2: XRD Experiment (2)

Figure 2A:
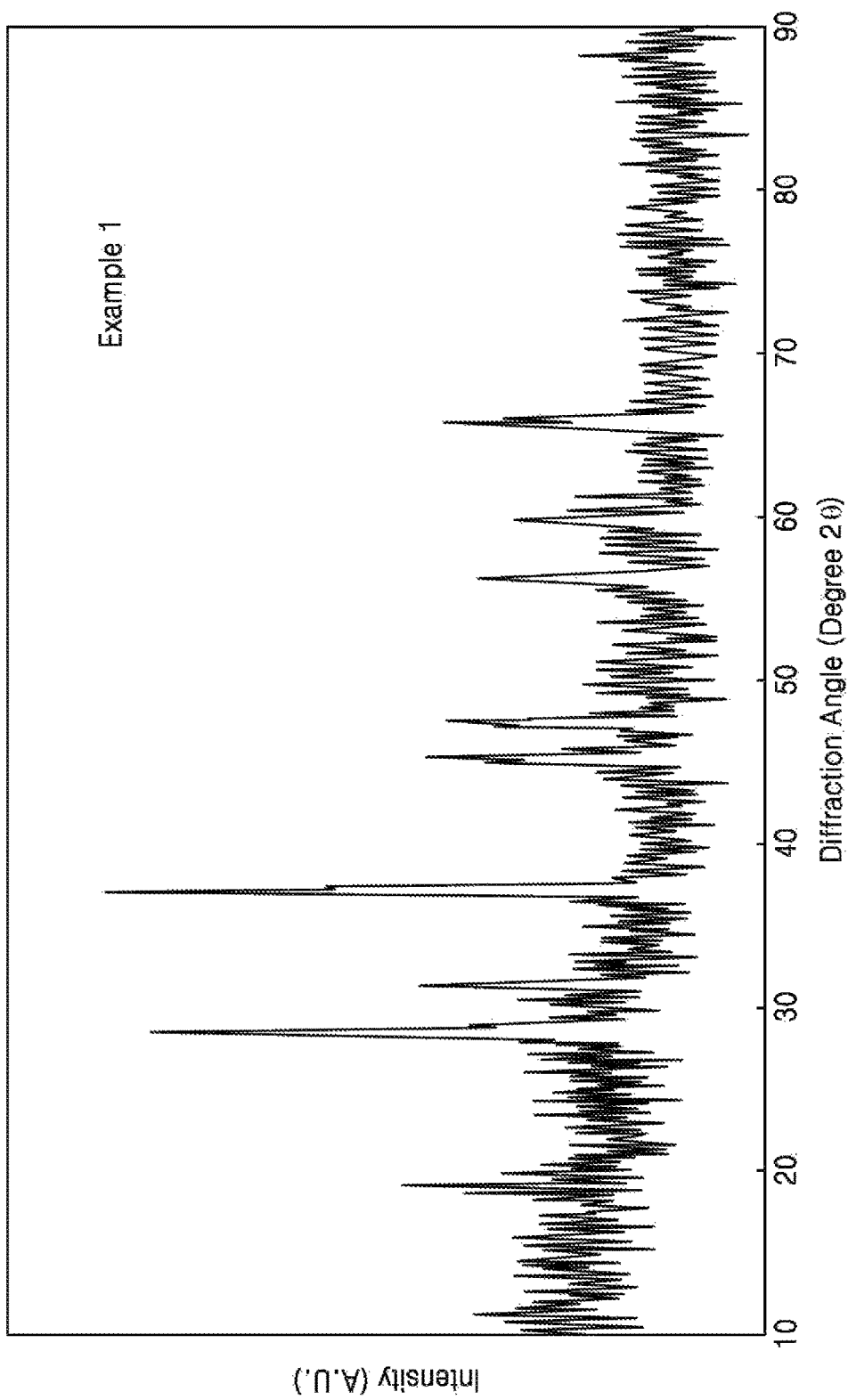
FIG. 2A is a graph of intensity (arbitrary units, a.u.) versus diffraction angle (degrees $2\theta$) showing the results of XRD analysis of a composite negative electrode active material prepared in Example 1.
Figure 2B:
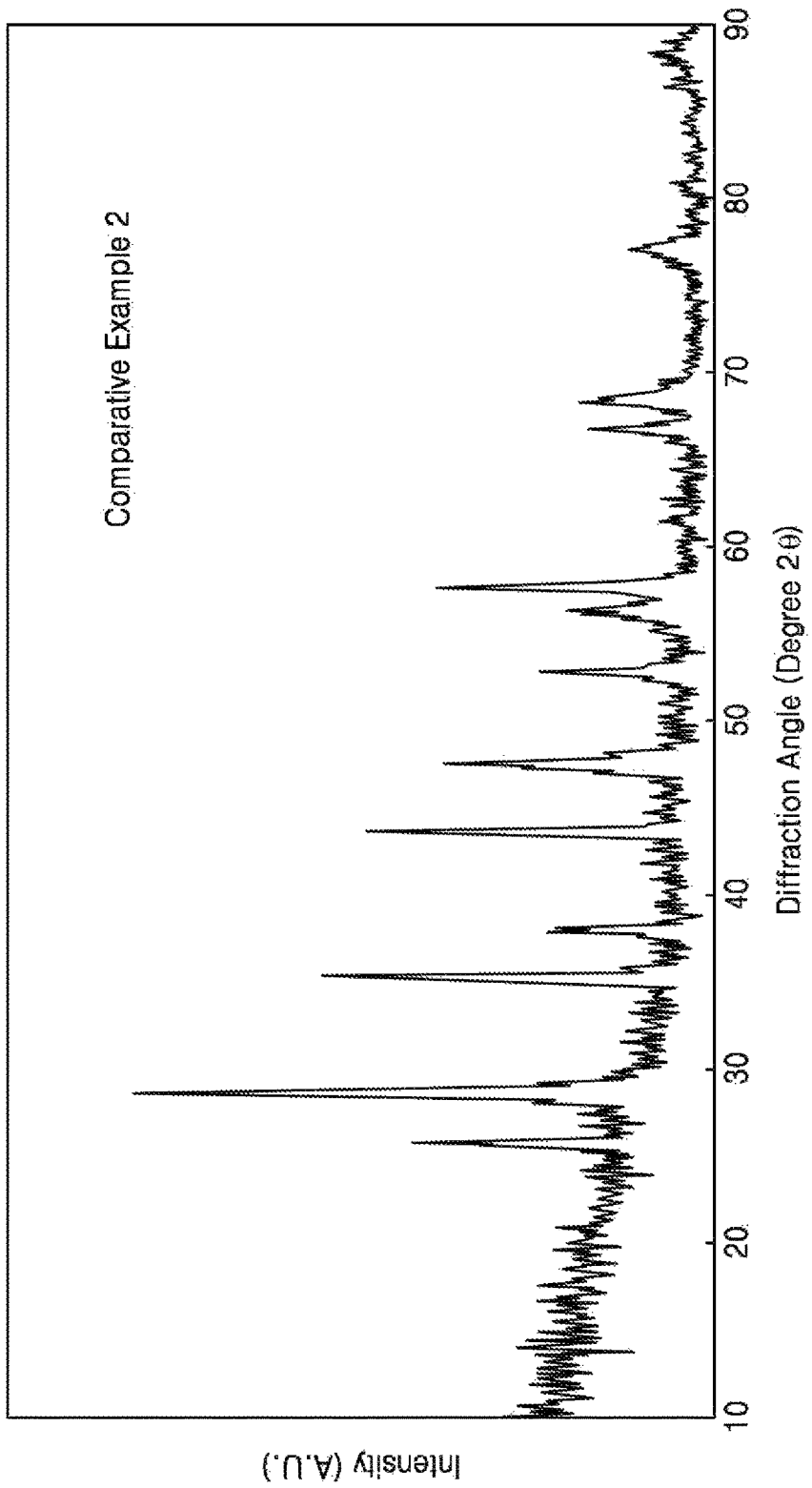
FIG. 2B is a graph of intensity (arbitrary units, a.u.) versus diffraction angle (degrees $2\theta$) showing the results of XRD analysis of a composite negative electrode active material prepared in Comparative Example 2.

X-ray diffraction (XRD) experiments were performed on the composite negative electrode active materials prepared in Example 1 and Comparative Example 2, and the experiment results were shown in FIGS. 2A and 2B, respectively. An XRD was measured by using a Cu-Kα ray.

As shown in FIG. 2A, a characteristic peak corresponding to a NiAl$_2$O$_4$ spinel structure appeared in Example 1, which included spinel oxide, but as shown in FIG. 2B, the spinel structure did not appear in Comparative Example 2.

As shown in FIG. 2A, in a lithium-free oxide including a dopant of the composite negative electrode active material in Example 1, a peak intensity ratio of a peak of crystal surface (111) and a peak of crystal face (311), that is, I(111)/I(311) was about 0.2 or more.

In addition, as shown in FIG. 2A, in the lithium-free oxide including the dopant of the composite negative electrode active material in Example 1, a peak intensity ratio of a peak of crystal surface (111) and a peak of crystal face (400), that is, I(111)/I(400) was about 0.6 or more.

On the contrary, as shown in FIG. 2B, the peak intensity ratio did not appear in the composite negative electrode active material of Comparative Example 2.

Evaluation Example 3: XPS Experiment

XPS experiments were performed on the spinel oxides prepared in Preparation Examples 1 to 4 and Comparative Preparation Example 1 to measure binding energy according to a content of F doped, and measuring results were shown in FIG. 3.

As shown in FIG. 3, in a case of Ni and Al, as the content of F was increased, a peak value of the binding energy was shifted toward high binding energy. That is, it was confirmed that as the content of F was increased, the biding energy was increased. In spinel oxide, as binding energy of metals is increased, a crystal structure of the spinel oxide may be stabilized.

Evaluation Example 4: Charge/discharge Experiment (1)

The lithium batteries manufactured in Examples 13 and 14 and Comparative Examples 15 to 20 were charged/ discharged 50 times in a cycle of charging the lithium batteries to a voltage of about 0.001 V (vs. Li) at a current rate of about 1,200 mA per 1 g of the composite negative electrode active material, and discharging the lithium batteries to a voltage of about 1.5 V (vs. Li) at the same current rate. A capacity retention ratio in a $50^{th}$ cycle may be expressed by Formula 1 below. Initial coulombic efficiency may be expressed by Formula 2 below. The capacity retention ratio in the fiftieth cycle and the initial coulombic efficiency were shown in Table 1 below.

capacity retention ratio[%] in $50^{th}$ cycle=[discharge capacity in $50^{th}$/discharge capacity in $1^{st}$ cycle]×100   Formula 1 initial coulombic efficiency[%]=[discharge capacity in $1^{st}$ cycle/charge capacity in $1^{st}$ cycle]×100   Formula 2

TABLE 1

|  | Capacity retention ratio [%] in $50^{th}$ cycle | Initial coulombic efficiency [%] |
|---|---|---|
| Comparative Example 15 | 10 | 80 |
| Comparative Example 16 | 63 | 77 |
| Comparative Example 17 | 59 | 62 |
| Comparative Example 18 | 60 | 75 |
| Comparative Example 19 | 87 | 79 |
| Comparative Example 20 | 85 | 78 |
| Example 13 | 89 | 79 |
| Example 14 | 92 | 79 |

As shown in Table 1, the lithium batteries of Examples 13 and 14 showed improved battery life characteristics compared to the lithium batteries of Comparative Examples 15 to 20. In addition, although the surface treatment layer is introduced, the charge/discharge efficiency was hardly changed.

Evaluation Example 5: Charge/discharge Experiment (2)

Figure 4:
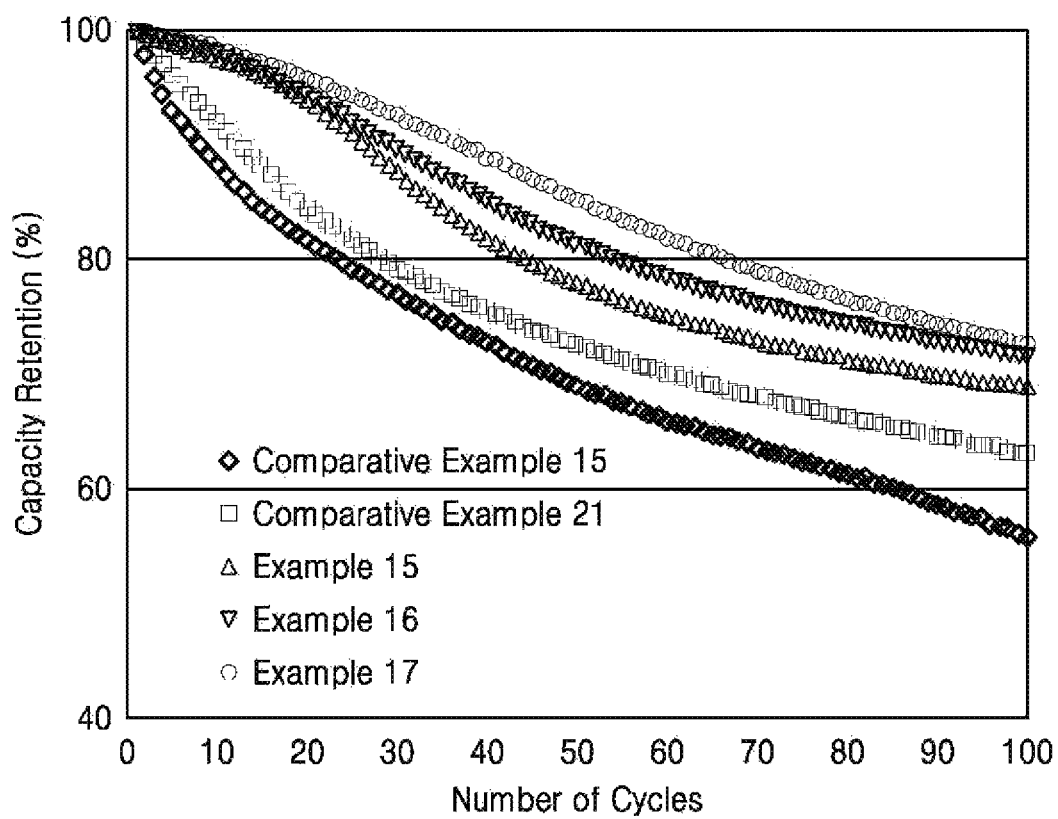
FIG. 4 is a graph of capacity retention (percent, %) versus number of cycles showing battery life characteristics of lithium batteries manufactured in Examples 15 to 17 and Comparative Examples 15 and 21.

The lithium batteries manufactured in Examples 15 and 18 and Comparative Examples 15 to 21 were charged/discharged 100 times in a cycle of charging the lithium batteries to a voltage of about 0.001 V (vs. Li) at a current rate of about 1,200 mA per 1 g of the composite negative electrode active material, and discharging the lithium batteries to a voltage of about 1.5 V (vs. Li) at the same current rate. A capacity retention ratio of a $100^{th}$ cycle may be expressed by Formula 3 below. The capacity retention ratio in the $100^{th}$ cycle and initial coulombic efficiency were shown in the following Table 2 and FIG. 4.

capacity retention ratio[%] in $100^{th}$ cycle=[discharge capacity in $100^{th}$/discharge capacity in $1^{st}$ cycle]×100   Formula 3

TABLE 2

|  | Capacity retention ratio [%] in $100^{th}$ |
|---|---|
| Comparative Example 15 | 55 |
| Comparative | 63 |

TABLE 2-continued

|  | Capacity retention ratio [%] in $100^{th}$ |
|---|---|
| Example 21 |  |
| Comparative Example 15 | 68 |
| Comparative Example 16 | 71 |
| Comparative Example 17 | 73 |
| Comparative Example 18 | 66 |

As shown in Table 2, the lithium batteries of Examples 15 to 18 showed improved battery life characteristics compared to the lithium batteries of Comparative Examples 15 to 21.

In addition, the lithium batteries of Examples 15 to 17 showed more improved battery life characteristics compared to the lithium battery of Example 18.

According to the exemplary embodiments, the core capable of intercalating/deintercalating lithium has a spinel structure and is surface-treated by lithium-free oxide including dopant, thus improving a high temperature stability, high temperature life characteristics, and a high rate capability.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A composite electrode active material comprising:
   a core, which is capable of intercalating and deintercalating lithium; and
   a surface treatment layer disposed on the core,
   wherein the surface treatment layer comprises a lithium-free oxide that has a spinel structure and includes a dopant,
   wherein the dopant comprises at least one selected from fluorine, sulfur, nitrogen, boron, and phosphorous.

2. The composite electrode active material of claim 1, wherein the dopant comprises at least one selected from $F^-$, $BF_4^-$, and $PF_6^-$.

3. The composite electrode active material of claim 1, wherein, when analyzed by X-ray photoelectron spectroscopy, as a content of the dopant is increased in the lithium-free oxide, a binding energy of a metal included in the lithium-free oxide is increased.

4. The composite electrode active material of claim 1, wherein a content of the dopant is about 0.1 moles or less, with respect to about 1 mole of the lithium-free oxide.

5. The composite electrode active material of claim 1, wherein the lithium-free oxide including the dopant is expressed by Chemical Formula 1:

$AM_2O_{4-a}X_a$,   Chemical Formula 1 wherein
   $0<a\leq 0.1$,
   A comprises at least one selected from tin, magnesium, molybdenum, copper, zinc, titanium, nickel, calcium, iron, vanadium, lead, cobalt, germanium, cadmium, mercury, strontium, manganese, aluminum, tungsten, and beryllium, M comprises at least one selected from magnesium, zinc, aluminum, vanadium, manganese, gallium, chromium, iron, rhodium, nickel, indium, and cobalt, X comprises at least one selected from fluorine, sulfur, nitrogen, boron, and phosphorous, and A is different from M.

6. The composite electrode active material of claim 1, wherein the lithium-free oxide including the dopant comprises at least one selected from $SnMg_2O_{4-a}X_a$ wherein $0<a\leq0.1$, $SnZn_2O_{4-a}X_a$ wherein $0<a\leq0.1$, $MgAl_2O_{4-a}X_a$ wherein $0<a\leq0.1$, $MoAl_2O_{4-a}X_a$ wherein $0<a\leq0.1$, $CuAl_2O_{4-a}X_a$ wherein $0<a\leq0.1$, $ZnAl_2O_{4-a}X_a$ wherein $0<a\leq0.1$, $ZnV_2O_{4-a}X_a$ wherein $0<a\leq0.1$, $TiMn_2O_{4-a}X_a$ wherein $0<a\leq0.1$, $ZnMn_2O_{4-a}X_a$ wherein $0<a\leq0.1$, $NiAl_2O_{4-a}X_a$ wherein $0<a\leq0.1$, $MgGa_2O_{4-a}X_a$ wherein $0<a\leq0.1$, $ZnGa_2O_{4-a}X_a$ wherein $0<a\leq0.1$, $CaGa_2O_{4-a}X_a$ wherein $0<a\leq0.1$, $TiMg_2O_{4-a}X_a$ wherein $0<a\leq0.1$, $VMg_2O_{4-a}X_a$ wherein $0<a\leq0.1$, $MgV_2O_{4-a}X_a$ wherein $0<a\leq0.1$, $FeV_2O_{4-a}X_a$ wherein $0<a\leq0.1$, $ZnV_2O_{4-a}X_a$ wherein $0<a\leq0.1$, $MgCr_2O_{4-a}X_a$ wherein $0<a\leq0.1$, $MnCr_2O_{4-a}X_a$ wherein $0<a\leq0.1$, $FeCr_2O_{4-a}X_a$ wherein $0<a\leq0.1$, $CoCr_2O_{4-a}X_a$ wherein $0<a\leq0.1$, $NiCr_2O_{4-a}X_a$ wherein $0<a\leq0.1$, $CuCr_2O_{4-a}X_a$ wherein $0<a\leq0.1$, $ZnCr_2O_{4-a}X_a$ wherein $0<a\leq0.1$, $CdCr_2O_{4-a}X_a$ wherein $0<a\leq0.1$, $TiMn_2O_{4-a}X_a$ wherein $0<a\leq0.1$, $ZnMn_2O_{4-a}X_a$ wherein $0<a\leq0.1$, $MgFe_2O_{4-a}X_a$ wherein $0<a\leq0.1$, $TiFe_2O_{4-a}X_a$ wherein $0<a\leq0.1$, $MnFe_2O_{4-a}X_a$ wherein $0<a\leq0.1$, $CoFe_2O_{4-a}X_a$ wherein $0<a\leq0.1$, $NiFe_2O_{4-a}X_a$ wherein $0<a\leq0.1$, $CuFe_2O_{4-a}X_a$ wherein $0<a\leq0.1$, $ZnFe_2O_{4-a}X_a$ wherein $0<a\leq0.1$, $CdFe_2O_{4-a}X_a$ wherein $0<a\leq0.1$, $AlFe_2O_{4-a}X_a$ wherein $0<a\leq0.1$, $PbFe_2O_{4-a}X_a$ wherein $0<a\leq0.1$, $MgCo_2O_{4-a}X_a$ wherein $0<a\leq0.1$, $TiCo_2O_{4-a}X_a$ wherein $0<a\leq0.1$, $ZnCo_2O_{4-a}X_a$ wherein $0<a\leq0.1$, $SnCo_2O_{4-a}X_a$ wherein $0<a\leq0.1$, $FeNi_2O_{4-a}X_a$ wherein $0<a\leq0.1$, $GeNi_2O_{4-a}X_a$ wherein $0<a\leq0.1$, $MgRh_2O_{4-a}X_a$ wherein $0<a\leq0.1$, $ZnRh_2O_{4-a}X_a$ wherein $0<a\leq0.1$, $TiZn_2O_{4-a}X_a$ wherein $0<a\leq0.1$, $SrAl_2O_{4-a}X_a$ wherein $0<a\leq0.1$, $CrAl_2O_{4-a}X_a$ wherein $0<a\leq0.1$, $MoAl_2O_{4-a}X_a$ wherein $0<a\leq0.1$, $FeAl_2O_{4-a}X_a$ wherein $0<a\leq0.1$, $CoAl_2O_{4-a}X_a$ wherein $0<a\leq0.1$, $MgGa_2O_{4-a}X_a$ wherein $0<a\leq0.1$, $ZnGa_2O_{4-a}X_a$ wherein $0<a\leq0.1$, $MgIn_2O_{4-a}X_a$ wherein $0<a\leq0.1$, $CaIn_2O_{4-a}X_a$ wherein $0<a\leq0.1$, $FeIn_2O_{4-a}X_a$ wherein $0<a\leq0.1$, $CoIn_2O_{4-a}X_a$ wherein $0<a\leq0.1$, $NiIn_2O_{4-a}X_a$ wherein $0<a\leq0.1$, $CdIn_2O_{4-a}X_a$ wherein $0<a\leq0.1$, and $HgIn_2O_{4-a}X_a$ wherein $0<a\leq0.1$, and wherein X comprises at least one selected from F, S, N, B, and P.

7. The composite electrode active material of claim 1, wherein the lithium-free oxide including the dopant is expressed by Chemical Formula 1:

$$AB_2O_{4-a}F_a, \quad \text{Chemical Formula 1}$$

wherein $0<a\leq0.1$,

A comprises at least one selected from Sn, Mg, Mo, Cu, Zn, Ti, Ni, Ca, Fe, V, Pb, Co, Ge, Cd, Hg, Sr, Mn, Al, W, and Be, B comprises at least one selected from Mg, Zn, Al, V, Mn, Ga, Cr, Fe, Rh, Ni, In, and Co, and A is different from B.

8. The composite electrode active material of claim 1, wherein the lithium-free oxide including the dopant comprises at least one selected from $SnMg_2O_{4-a}F_a$ wherein $0<a\leq0.1$, $SnZn_2O_{4-a}F_a$ wherein $0<a\leq0.1$, $MgAl_2O_{4-a}F_a$ wherein $0<a\leq0.1$, $MoAl_2O_{4-a}F_a$ wherein $0<a\leq0.1$, $CuAl_2O_{4-a}F_a$ wherein $0<a\leq0.1$, $ZnAl_2O_{4-a}F_a$ wherein $0<a\leq0.1$, $ZnV_2O_{4-a}F_a$ wherein $0<a\leq0.1$, $TiMn_2O_{4-a}F_a$ wherein $0<a\leq0.1$, $ZnMn_2O_{4-a}F_a$ wherein $0<a\leq0.1$, $NiAl_2O_{4-a}F_a$ wherein $0<a\leq0.1$, $MgGa_2O_{4-a}F_a$ wherein $0<a\leq0.1$, $ZnGa_2O_{4-a}F_a$ wherein $0<a\leq0.1$, $CaGa_2O_{4-a}F_a$ wherein $0<a\leq0.1$, $TiMg_2O_{4-a}F_a$ wherein $0<a\leq0.1$, $VMg_2O_{4-a}F_a$ wherein $0<a\leq0.1$, $MgV_2O_{4-a}F_a$ wherein $0<a\leq0.1$, $FeV_2O_{4-a}F_a$ wherein $0<a\leq0.1$, $ZnV_2O_{4-a}F_a$ wherein $0<a\leq0.1$, $MgCr_2O_{4-a}F_a$ wherein $0<a\leq0.1$, $MnCr_2O_{4-a}F_a$ wherein $0<a\leq0.1$, $FeCr_2O_{4-a}F_a$ wherein $0<a\leq0.1$, $CoCr_2O_{4-a}F_a$ wherein $0<a\leq0.1$, $NiCr_2O_{4-a}F_a$ wherein $0<a\leq0.1$, $CuCr_2O_{4-a}F_a$ wherein $0<a\leq0.1$, $ZnCr_2O_{4-a}F_a$ wherein $0<a\leq0.1$, $CdCr_2O_{4-a}F_a$ wherein $0<a\leq0.1$, $TiMn_2O_{4-a}F_a$ wherein $0<a\leq0.1$, $ZnMn_2O_{4-a}F_a$ wherein $0<a\leq0.1$, $MgFe_2O_{4-a}F_a$ wherein $0<a\leq0.1$, $TiFe_2O_{4-a}F_a$ wherein $0<a\leq0.1$, $MnFe_2O_{4-a}F_a$ wherein $0<a\leq0.1$, $CoFe_2O_{4-a}F_a$ wherein $0<a\leq0.1$, $NiFe_2O_{4-a}F_a$ wherein $0<a\leq0.1$, $CuFe_2O_{4-a}F_a$ wherein $0<a\leq0.1$, $ZnFe_2O_{4-a}F_a$ wherein $0<a\leq0.1$, $CdFe_2O_{4-a}F_a$ wherein $0<a\leq0.1$, $AlFe_2O_{4-a}F_a$ wherein $0<a\leq0.1$, $PbFe_2O_{4-a}F_a$ wherein $0<a\leq0.1$, $MgCo_2O_{4-a}F_a$ wherein $0<a\leq0.1$, $TiCo_2O_{4-a}F_a$ wherein $0<a\leq0.1$, $ZnCo_2O_{4-a}F_a$ wherein $0<a\leq0.1$, $SnCo_2O_{4-a}F_a$ wherein $0<a\leq0.1$, $FeNi_2O_{4-a}F_a$ wherein $0<a\leq0.1$, $GeNi_2O_{4-a}F_a$ wherein $0<a\leq0.1$, $MgRh_2O_{4-a}F_a$ wherein $0<a\leq0.1$, $ZnRh_2O_{4-a}F_a$ wherein $0<a\leq0.1$, $TiZn_2O_{4-a}F_a$ wherein $0<a\leq0.1$, $SrAl_2O_{4-a}F_a$ wherein $0<a\leq0.1$, $CrAl_2O_{4-a}F_a$ wherein $0<a\leq0.1$, $MoAl_2O_{4-a}F_a$ wherein $0<a\leq0.1$, $FeAl_2O_{4-a}F_a$ wherein $0<a\leq0.1$, $CoAl_2O_{4-a}F_a$ wherein $0<a\leq0.1$, $MgGa_2O_{4-a}F_a$ wherein $0<a\leq0.1$, $ZnGa_2O_{4-a}F_a$ wherein $0<a\leq0.1$, $MgIn_2O_{4-a}F_a$ wherein $0<a\leq0.1$, $CaIn_2O_{4-a}F_a$ wherein $0<a\leq0.1$, $FeIn_2O_{4-a}F_a$ wherein $0<a\leq0.1$, $CoIn_2O_{4-a}F_a$ wherein $0<a\leq0.1$, $NiIn_2O_{4-a}F_a$ wherein $0<a\leq0.1$, $CdIn_2O_{4-a}F_a$ wherein $0<a\leq0.1$, and $HgIn_2O_{4-a}F_a$ wherein $0<a\leq0.1$.

9. The composite electrode active material of claim 1, wherein the lithium-free oxide including the dopant comprises at least one selected from $SnMg_2O_{4-a}F_a$ wherein $0.001\leq a\leq0.05$, $SnZn_2O_{4-a}F_a$ wherein $0.001\leq a\leq0.05$, $MgAl_2O_{4-a}F_a$ wherein $0.001\leq a\leq0.05$, $CuAl_2O_{4-a}F_a$ wherein $0.001\leq a\leq0.05$, $ZnAl_2O_{4-a}F_a$ wherein $0.001\leq a\leq0.05$, and $NiAl_2O_{4-a}F_a$ wherein $0.001\leq a\leq0.05$.

10. The composite electrode active material of claim 1, wherein a content of the lithium-free oxide including the dopant is about 50 weight percent or less, with respect to a total weight of the composite electrode active material.

11. The composite electrode active material of claim 1, wherein the core comprises a negative electrode active material.

12. The composite electrode active material of claim 1, wherein the core comprises at least one selected from lithium metal, a lithium-alloyable metal, transition metal oxide, and non-transition metal oxide.

13. The composite electrode active material of claim 12, wherein the core further comprises a carbonaceous material.

14. The composite electrode active material of claim 1, wherein the core comprises a positive electrode active material.

15. An electrode comprising the composite electrode active material of claim 1.

16. A lithium battery comprising the electrode of claim 15.

17. A method of preparing a composite electrode active material, the method comprising:
providing a lithium-free oxide that has a spinel structure and includes a dopant;

mixing a core comprising an electrode active material and the lithium-free oxide including the dopant together to form a mixture; and milling the mixture using a dry method to form, on the core, a surface treatment layer comprising the lithium-free oxide that includes the dopant to prepare the composite electrode active material, wherein the dopant comprises at least one selected from fluorine, sulfur, nitrogen, boron, and phosphorous.

18. The method of claim 17, wherein the dry method comprises at least one selected from a planetary ball mill method, a ball mill method, a hybridization method, and a mechanofusion method.

19. The method of claim 17, wherein the providing of the lithium-free oxide including the dopant comprises:

milling a lithium-free oxide and a dopant precursor to prepare a mixture; and sintering the mixture to prepare the lithium-free oxide including the dopant.

20. The method of claim 17, wherein the preparing of the lithium-free oxide including the dopant comprises:

milling a lithium-free oxide precursor and a dopant precursor to prepare a mixture; and oxidizing the mixture to prepare the lithium-free oxide including the dopant.

* * * * *